US012199269B2

United States Patent
Yushin et al.

(10) Patent No.: US 12,199,269 B2
(45) Date of Patent: Jan. 14, 2025

(54) DENSIFIED BATTERY ELECTRODES AND METHODS THEREOF

(71) Applicant: Sila Nanotechnologies, Inc., Alameda, CA (US)

(72) Inventors: Gleb Yushin, Atlanta, GA (US); Gene Berdichevsky, Alameda, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 0 days.

(21) Appl. No.: 18/541,284

(22) Filed: Dec. 15, 2023

(65) Prior Publication Data

US 2024/0162414 A1    May 16, 2024

Related U.S. Application Data

(63) Continuation of application No. 18/158,995, filed on Jan. 24, 2023, now Pat. No. 11,848,438, which is a (Continued)

(51) Int. Cl.
*H01M 4/134* (2010.01)
*H01M 4/02* (2006.01)
(Continued)

(52) U.S. Cl.
CPC ......... *H01M 4/133* (2013.01); *H01M 4/0404* (2013.01); *H01M 4/0435* (2013.01); (Continued)

(58) Field of Classification Search
CPC .. H01M 4/133; H01M 4/0404; H01M 4/0435; H01M 4/134; H01M 4/364;
(Continued)

(56) References Cited

U.S. PATENT DOCUMENTS

2018/0062159 A1* 3/2018 El-Kady ............... H01M 4/505
2021/0013498 A1* 1/2021 Yao ....................... H01M 4/133

FOREIGN PATENT DOCUMENTS

KR    2016-0008519 A  *  1/2016

OTHER PUBLICATIONS

EPO machine generated English translation of KR 2016-0008519A (Year: 2016).*

* cited by examiner

*Primary Examiner* — Christopher P Domone
*Assistant Examiner* — Kimberly Wyluda
(74) *Attorney, Agent, or Firm* — MUNCY, GEISSLER, OLDS & LOWE, P.C.; Daniel Podhajny

(57) ABSTRACT

In an aspect, a Li-ion cell may comprise a densified electrode exhibiting an areal capacity loading of more than about 4 mAh/cm². For example, the densified electrode may a first electrode part arranged on a current collector and a second electrode part on top of the first electrode part, the second electrode part of the at least one densified electrode having a higher porosity than the first electrode part of the at least one densified electrode. In some designs, the densified electrode may be fabricated by densifying electrode layers via a pressure roller while maintaining a contacting part of the pressure roller at a temperature that is less than a temperature of the second electrode part. In some designs, the applied pressure is a time-varying (e.g., frequency modulated) pressure. In some designs, a drying time for a slurry to produce the densified electrode may range from around 1-120 seconds.

34 Claims, 12 Drawing Sheets

Related U.S. Application Data continuation of application No. 16/883,661, filed on May 26, 2020, now Pat. No. 11,594,718.

(60) Provisional application No. 62/852,151, filed on May 23, 2019.

(51) Int. Cl.
| | |
|---|---|
| *H01M 4/04* | (2006.01) |
| *H01M 4/133* | (2010.01) |
| *H01M 4/36* | (2006.01) |
| *H01M 4/38* | (2006.01) |
| *H01M 4/587* | (2010.01) |
| *H01M 10/0525* | (2010.01) |
| *H01M 4/62* | (2006.01) |

(52) U.S. Cl.
CPC ........... *H01M 4/134* (2013.01); *H01M 4/364* (2013.01); *H01M 4/386* (2013.01); *H01M 4/587* (2013.01); *H01M 10/0525* (2013.01); *H01M 2004/021* (2013.01); *H01M 4/625* (2013.01)

(58) Field of Classification Search
CPC ...... H01M 4/386; H01M 4/587; H01M 4/625; H01M 10/0525; H01M 2004/021
See application file for complete search history.

DENSIFIED BATTERY ELECTRODES AND METHODS THEREOF

CROSS-REFERENCE TO RELATED APPLICATIONS

The present application for patent is a Continuation of U.S. Non-Provisional application Ser. No. 18/158,995, entitled "DENSIFIED BATTERY ELECTRODES AND METHODS THEREOF," filed Jan. 24, 2023, which is a Continuation of U.S. Non-Provisional application Ser. No. 16/883,661, entitled "DENSIFIED BATTERY ELECTRODES AND METHODS THEREOF," filed May 26, 2020, which in turn claims the benefit of U.S. Provisional Application No. 62/852,151, entitled "METHODS FOR IMPROVING PERFORMANCE OF THICK, VOLUMETRIC ENERGY-DENSE BATTERY ELECTRODES AND COMPOSITIONS OF BATTERY CELLS COMPRISING SAME," filed May 23, 2019, each of which is expressly incorporated herein by reference in its entirety.

BACKGROUND

Field

Embodiments of the present disclosure relate generally to energy storage devices, and more particularly to battery technology and the like.

Background

Owing in part to their relatively high energy densities, relatively high specific energy, light weight, and potential for long lifetimes, advanced rechargeable and primary (not rechargeable) batteries are desirable for a wide range of wearables, portable consumer electronics, electric vehicles, grid storage, aerospace and other important applications.

However, despite the increasing commercial prevalence of rechargeable Li-ion batteries, further development of these batteries is needed, particularly for potential applications in battery-powered electrical vehicles, consumer electronics and aerospace applications, among others. Fabrication of thicker and denser electrodes with a low concentration of defects and well controlled porosity is important for reducing battery cost and increasing volumetric and gravimetric battery energy densities. Unfortunately, conventional routes to produce such electrodes typically fail to achieve the desired level of porosity control, often require excessive efforts and costs, and often exhibit undesirably low rate performance and stability.

Accordingly, there remains a need for improved battery cells, components, and other related materials and manufacturing processes.

SUMMARY

Embodiments disclosed herein address the above stated needs by providing improved battery components, improved batteries made therefrom, and methods of making and using the same.

An embodiment of the present disclosure is directed to a Li-ion battery, comprising anode and cathode electrodes an electrolyte ionically coupling the anode and the cathode electrodes, and a separator electrically separating the anode and the cathode electrodes, wherein the anode and cathode electrodes comprise at least one densified electrode exhibiting an areal capacity loading of more than about 4 mAh/cm$^2$ and comprising a first electrode part arranged on a current collector and a second electrode part on top of the first electrode part, the second electrode part of the at least one densified electrode having a higher porosity than the first electrode part of the at least one densified electrode.

Another embodiment of the present disclosure is directed to a densified electrode for a Li-ion battery, comprising a first electrode part arranged on a current collector, and a second electrode part arranged on top of the first electrode part, the second electrode part having a higher porosity than the bottom electrode part, wherein the densified electrode exhibits an areal capacity loading in excess of about 4 mAh/cm$^2$.

Another embodiment of the present disclosure is directed to a method of fabricating an electrode, comprising coating a current collector with a set of electrode layers so as to define a first electrode part arranged on the current collector and a second electrode part arranged on top of the first electrode part, and densifying the set of electrode layers after the coating via a pressure roller to produce a densified electrode while maintaining a contacting part of the pressure roller at a temperature that is less than a temperature of the second electrode part.

Another embodiment of the present disclosure is directed to a method of fabricating an electrode for a Li-ion battery, comprising coating a current collector with one or more electrode layers, and densifying the one or more electrode layers after the coating via applying a time-varying pressure to produce a densified electrode.

Another embodiment of the present disclosure is directed to a method of fabricating an electrode for a Li-ion battery, comprising coating a current collector with an electrode slurry comprising at least active electrode particles and a solvent, and drying, during a drying time, the electrode slurry to produce an at least partially dried electrode coating, wherein the drying time ranges from around 1 to around 120 seconds.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
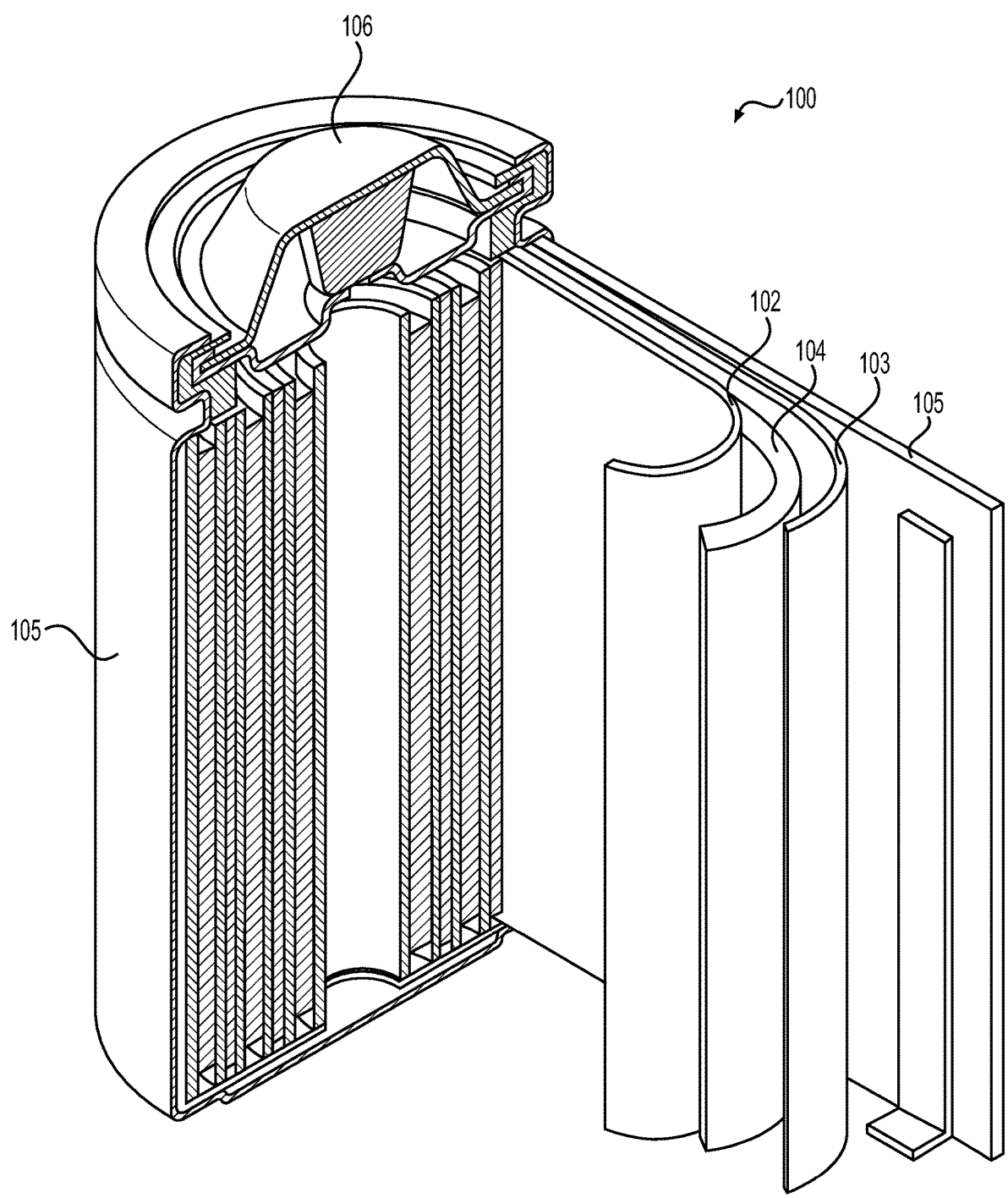
FIG. 1 illustrates an example (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details. Further, the terminology of "at least partially" is intended for interpretation as "partially, substantially or completely".

While the description below may describe certain examples in the context of rechargeable and primary Li and Li-ion batteries (for brevity and convenience, and because of the current popularity of Li technology), it will be appreciated that various aspects may be applicable to other rechargeable and primary batteries (such as Na-ion, Mg-ion, K-ion, Ca-ion, Al-ion and other metal-ion batteries, anion-ion (e.g., F-ion) batteries, dual ion batteries, alkaline batteries, acid batteries, solid state batteries, etc.) as well as electrochemical capacitors (including double layer capacitors and so-called supercapacitors) with various electrolytes and various hybrid devices.

While the description below may describe certain examples of the material formulations for several specific types of cathode or anode materials, it will be appreciated that various aspects may be applicable to various other electrode materials.

While the description below may describe certain embodiments in the context of preparation of porous electrodes for energy storage devices, it will be appreciated that various aspects may be applicable for preparation of other porous bodies comprised of compacted individual particles.

While the description below may describe certain embodiments in the context of preparation of porous electrodes comprising polymer binder, it will be appreciated that various aspects may be applicable to porous electrodes (and other porous bodies) comprising other types of binder(s) or mixture of binders or not comprising binder at all.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 50 μm to 1200 μm (i.e., a level of precision in units or increments of ones) encompasses (in μm) a set of [50, 51, 52, 43, . . . , 1199, 1200], as if the intervening numbers 51 through 1199 in units or increments of ones were expressly disclosed. In another example, a numerical percentage range from 0.01% to 10.00% (i.e., a level of precision in units or increments of hundredths) encompasses (in %) a set of [0.01, 0.02, 0.03, . . . , 9.99, 10.00], as if the intervening numbers between 0.02 and 9.99 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

Some examples below characterize numerical values using approximations (e.g., terms such as "about", "around", "approximately", "—", etc.). In some designs, such approximations may be accurate either to a degree commensurate with the relevant instrumentation (e.g., caliper or thickness gauge or pressure gauge, etc.) for measuring the associated value, or to a degree to which that value would be rounded at an associated level of precision (e.g., whichever is greater). For example, "about 4" may encompass any value between 3.5 and 4.5, "about 4.0" may encompass any value between 3.95 and 4.05", "about 4.00" may encompass any value between 3.995 and 4.005, and so on.

FIG. 1 illustrates an example metal-ion (e.g., Li-ion or Na-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) or coin-type batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Conventional electrodes utilized in Li-ion or Na-ion batteries may be produced by (i) formation of a slurry comprising active materials, conductive additives, binder solutions and, in some cases, surfactant or other functional additives; (ii) casting the slurry onto a metal foil (e.g., Cu foil for most Li-ion battery anodes and Al foil for most Li-ion battery cathodes and for most Na-ion battery anodes and cathodes); (iii) drying the casted electrodes to completely evaporate the solvent; and (iv) calendaring (densification) of the dried electrodes by uniform pressure rolling. In case of thicker electrodes that exhibit relatively high areal capacity (e.g., above about 4 mA/cm$^2$), calendaring may be conducted multiple times in order to achieve low porosity and a high volume-fraction of active materials and thus high volumetric capacity (e.g., above about 600 mAh/cm$^3$).

Batteries may be produced by (i) assembling/stacking (or rolling into so-called jelly roll) the anode/separator/cathode/separator sandwich; (ii) inserting the stack (or jelly roll) into the battery housing (casing); (iii) filling electrolyte into the pores of the electrodes and the separator (and also into the remaining areas of the casing)—often under vacuum; (iv) pre-sealing the battery cell (often under vacuum); (v) conducting so-called "formation" cycle(s) where the battery is slowly charged and discharged (e.g., one or more times); (vi) removing formed gases, sealing the cell, testing the cell for quality and shipping quality cells to customers.

Both liquid and solid electrolytes may be used for the designs herein. Exemplary liquid electrolytes for Li- or Na-based batteries of this type may be composed of a single Li or Na salt (such as LiPF$_6$ for Li-ion batteries and NaPF$_6$ or NaClO$_4$ salts for Na-ion batteries) in a mixture of organic solvents (such as a mixture of carbonates and/or other suitable solvents). Other suitable organic solvents include nitriles, esters, sulfones, sulfoxides, phosphorous-based solvents, silicon-based solvents, ethers, and others. In some designs, such solvents may be modified (e.g., be sulfonated or fluorinated). In some designs, the electrolytes may also comprise ionic liquids (in some designs, neutral ionic liquids; in other designs, acidic and basic ionic liquids). In some designs, the electrolytes may also comprise mixtures of various salts (e.g., mixtures of several Li salts or mixtures of Li and non-Li salts for rechargeable Li and Li-ion batteries).

In the case of aqueous Li-ion (or aqueous Na-ion, K-ion, Ca-ion, etc.) batteries, electrolytes may include a solution (e.g., aqueous solution or mixed aqueous-organic solution) of inorganic Li (or Na, K, Ca, etc.) salt(s) (such as Li$_2$SO$_4$, LiNO$_3$, LiCl, LiBr, Li$_3$PO$_4$, H$_2$LiO$_4$P, C$_2$F$_3$LiO$_2$, C$_2$F$_3$LiO$_3$S, Na$_2$O$_3$Se, Na$_2$SO$_4$, Na$_2$O$_7$Si$_3$, Na$_3$O$_9$P$_3$, C$_2$F$_3$NaO$_2$, etc.). These electrolytes may also comprise solutions of organic Li (or Na, K, Ca, etc.) salts, such as (listed with respect to Li for brevity) metal salts of carboxylic acids (such as HCOOLi, CH$_3$COOLi, CH$_3$CH$_2$COOLi, CH$_3$(CH$_2$)$_2$COOLi, CH$_3$(CH$_2$)$_3$COOLi, CH$_3$(CH$_2$)$_4$COOLi, CH$_3$(CH$_2$)$_5$COOLi, CH$_3$(CH$_2$)$_6$COOLi, CH$_3$(CH$_2$)$_7$COOLi, CH$_3$(CH$_2$)$_8$COOLi, CH$_3$(CH$_2$)$_9$COOLi, CH$_3$(CH$_2$)$_{10}$COOLi, CH$_3$(CH$_2$)$_{11}$COOLi, CH$_3$(CH$_2$)$_{12}$COOLi, CH$_3$(CH$_2$)$_{13}$COOLi, CH$_3$(CH$_2$)$_{14}$COOLi, CH$_3$(CH$_2$)$_{15}$COOLi, CH$_3$(CH$_2$)$_{16}$COOLi, CH$_3$(CH$_2$)$_{17}$COOLi, CH$_3$(CH$_2$)$_{18}$COOLi and others with the formula CH$_3$(CH$_2$)$_x$COOLi, where x ranges up to 50); metal salts of sulfonic acids (e.g., RS(=O)$_2$—OH, where R is a metal salt of an organic radical, such as a CH$_3$SO$_3$Li, CH$_3$CH$_2$SO$_3$Li, C$_6$H$_5$SO$_3$Li, CH$_3$C$_6$H$_4$SO$_3$Li, CF$_3$SO$_3$Li, [CH$_2$CH(C$_6$H$_4$)SO$_3$Li]$_n$ and others) and various other organometallic reagents (such as various organolithium reagents), to name a few. In some designs, such solutions may also comprise mixtures of inorganic and organic salts, various other salt mixtures (for example, a mixture of a Li salt and a salt of non-Li metals and semimetals), and, in some cases, hydroxide(s) (such as LiOH, NaOH, KOH, Ca(OH)$_2$, etc.), and, in some cases, acids (including organic acids). In some designs, such aqueous electrolytes may also comprise neutral or acidic or basic ionic liquids (from approximately 0.00001 wt. % to approximately 40 wt. % relative to the total weight of electrolyte). In some designs, such "aqueous" (or water containing) electrolytes may also comprise organic solvents (from approximately 0.00001 wt. % to approximately 40 wt. % relative to the total weight of electrolyte), in addition to water. Illustrative examples of suitable organic solvents may include carbonates (e.g., propylene carbonate, ethylene carbonate, diethyl carbonate, dimethyl carbonate, ethyl methyl carbonate, fluoroethylene carbonate, vinylene carbonate, and others), various nitriles (e.g., acetonitrile, etc.), various esters, various sulfones (e.g., propane sulfone, etc.), various sultones, various sulfoxides, various phosphorous-based solvents, various silicon-based solvents, various ethers, and others.

The most common salt used in a Li-ion battery electrolyte, for example, is LiPF$_6$, while less common salts include lithium tetrafluoroborate (LiBF$_4$), lithium perchlorate (LiClO$_4$), lithium bis(oxalato)borate (LiB(C$_2$O$_4$)$_2$), lithium difluoro(oxalate)borate (LiBF$_2$(C$_2$O$_4$)), various lithium imides (such as SO$_2$FN$^-$(Li$^+$)SO$_2$F, CF$_3$SO$_2$N$^-$(Li$^+$)SO$_2$CF$_3$, CF$_3$CF$_2$SO$_2$N$^-$(Li$^+$)SO$_2$CF$_3$, CF$_3$CF$_2$SO$_2$N$^-$(Li$^+$)SO$_2$CF$_2$CF$_3$, CF$_3$SO$_2$N$^-$(Li$^+$)SO$_2$CF$_2$OCF$_3$, CF$_3$OCF$_2$SO$_2$N$^-$(Li$^+$)SO$_2$CF$_2$OCF$_3$, C$_6$F$_5$SO$_2$N$^-$(Li$^+$)SO$_2$CF$_3$, C$_6$F$_5$SO$_2$N$^-$(Li$^+$)SO$_2$C$_6$F$_5$ or CF$_3$SO$_2$N$^-$(Li$^+$)SO$_2$PhCF$_3$, and others), and others. Electrolytes for Mg-ion, K-ion, Ca-ion, and Al-ion batteries are often more exotic as these batteries are in earlier stages of development. In some designs, such electrolytes may comprise different salts and solvents (in some cases, ionic liquids may replace organic solvents for certain applications).

In some designs, some electrolytes in aqueous batteries (such as alkaline batteries, including nickel-metal hydride batteries) may comprise an alkaline solution (for example, a mixture of KOH and LiOH solutions). In some designs, electrolytes in aqueous batteries (such as lead acid batteries) may comprise an acidic aqueous solution (for example, H$_2$SO$_4$ aqueous solution). In some designs, electrolytes in aqueous batteries may comprise an organic solvent as an additive. In some designs, electrolytes in aqueous batteries may comprise two or more organic solvent(s) or ionic liquid(s) as additive(s) or substantial components of the electrolyte.

Certain conventional cathode materials utilized in Li-ion batteries are of an intercalation-type. In such cathodes, metal ions are intercalated into and occupy the interstitial positions of such materials during the charge or discharge of a battery. Such cathodes typically experience very small volume changes when used in electrodes. Such cathode materials also may exhibit high density (e.g., about 3.8-6 g/cm$^3$ at the individual particle basis). Illustrative examples of such intercalation-type cathode materials include but are not limited to lithium cobalt oxide (LCO), lithium nickel cobalt aluminum oxide (NCA), lithium nickel manganese cobalt oxide (NMC), lithium manganese oxide (LMO), lithium nickel oxide (LNO), high voltage spinel, such as lithium manganese nickel oxide (LiMn$_{1.5}$Ni$_{0.5}$O$_4$ or LMNO), lithium metal (e.g., iron or cobalt or nickel or manganese or mixture of these and other metals) phosphate (LMP such as LFP, LCP, LNP, LNP, etc.), lithium metal silicates (Li$_2$MSiO$_4$, where M could be Ni, Co, Mn, Fe, various mixture of these and other metals, etc.), various other intercalation cathode materials including those that comprise surface coatings or exhibit gradient composition within individual particles, among others. Polyvinylidene fluoride, or polyvinylidene difluoride (PVDF), is the most common binder used in these electrodes. Carbon black and carbon nanotubes are the most common conductive additive used.

Conversion-type cathode materials for rechargeable Li-ion or Li batteries may offer higher energy density, higher specific energy, or higher specific or volumetric capacities compared to intercalation-type cathode materials. For example, fluoride-based cathodes may offer outstanding technological potential due to their very high capacities, in some cases exceeding about 300 mAh/g (greater than about 1200 mAh/cm$^3$ at the electrode level). For example, in a Li-free state, FeF$_3$ offers a theoretical specific capacity of 712 mAh/g; FeF$_2$ offers a theoretical specific capacity of 571 mAh/g; MnF$_3$ offers a theoretical specific capacity of 719 mAh/g; CuF$_2$ offers a theoretical specific capacity of 528 mAh/g; NiF$_2$ offers a theoretical specific capacity of 554 mAh/g; PbF$_2$ offers a theoretical specific capacity of 219 mAh/g; BiF$_3$ offers a theoretical specific capacity of 302 mAh/g; BiF$_5$ offers a theoretical specific capacity of 441 mAh/g; SnF$_2$ offers a theoretical specific capacity of 342 mAh/g; SnF$_4$ offers a theoretical specific capacity of 551 mAh/g; SbF$_3$ offers a theoretical specific capacity of 450 mAh/g; SbF$_5$ offers a theoretical specific capacity of 618 mAh/g; CdF$_2$ offers a theoretical specific capacity of 356 mAh/g; and ZnF$_2$ offers a theoretical specific capacity of 519 mAh/g. Mixtures (for example, in the form of alloys) of fluorides may offer a theoretical capacity approximately calculated according to the rule of mixtures. In some designs, the use of mixed metal fluorides may sometimes be advantageous (e.g., may offer higher rates, lower resistance, higher practical capacity, or longer stability). In a fully lithiated state, metal fluorides convert to a composite comprising a mixture of metal and LiF clusters (or nanoparticles). Examples of the overall reversible reactions of the conversion-type metal fluoride cathodes may include $2Li+ CuF_2 \rightarrow 2LiF+Cu$ for $CuF_2$-based cathodes or $3Li+ FeF_3 \rightarrow 3LiF+Fe$ for $FeF_3$-based cathodes or $2Li+ NiF_2 \rightarrow 2LiF+Ni$ for $NiF_2$-based cathodes, etc.). It will be appreciated that metal fluoride-based cathodes may be prepared in both Li-free or partially lithiated or fully lithiated states.

Another example of a promising conversion-type Li-ion battery cathode (or, in some cases, anode) material is sulfur (S) (in a Li-free state) or lithium sulfide ($Li_2S$, in a fully lithiated state). In order to reduce dissolution of active material during cycling, to improve electrical conductivity, or to improve mechanical stability of S/$Li_2S$ electrodes in some designs, one may advantageously utilize porous S, $Li_2S$, porous S—C (nano)composites, $Li_2S$—C(nano)composites, $Li_2S$-metal oxide (nano)composites, $Li_2S$—C-metal oxide (nano)composites, $Li_2S$—C-metal sulfide (nano)composites, $Li_2S$-metal sulfide (nano)composites, $Li_2S$—C-mixed metal oxide (nano)composites, $Li_2S$—C-mixed metal sulfide (nano)composites, porous S-polymer (nano)composites, or other composites or (nano)composites comprising S or $Li_2S$, or both. In some designs, such (nano)composites may advantageously comprise conductive carbon. In some designs, such (nano)composites may advantageously comprise metal oxides or mixed metal oxides. In some designs, such (nano)composites may advantageously comprise metal sulfides or mixed metal sulfides. In some examples, mixed metal oxides or mixed metal sulfides may comprise lithium metal. In some examples, mixed metal oxides may comprise titanium metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive. In some examples, various other intercalation-type active materials may be utilized instead of or in addition to metal oxides or metal sulfides. In some designs, such an intercalation-type active material exhibits charge storage (e.g., Li insertion/extraction capacity) in the potential range close to that of S or $Li_2S$ (e.g., within about 1.5-3.8 V vs. Li/Li$^+$).

Unfortunately, many conversion-type electrodes used in Li-ion batteries suffer from performance limitations. Formation of (nano)composites may, at least partially, overcome such limitations. For example, (nano)composites in some designs may offer reduced voltage hysteresis, improved capacity utilization, improved rate performance, improved mechanical and sometimes improved electrochemical stability, reduced volume changes, and/or other positive attributes. Examples of such composite cathode materials include, but are not limited to, LiF—Cu—Fe—C nanocomposites, LiF—Cu—CuO—C nanocomposites, LiF—Cu—Fe—CuO—C nanocomposites, LiF—Cu—Fe—CuO—$Fe_2O_3$—C nanocomposites, $FeF_2$—C nanocomposites, $FeF_2$—$Fe_2O_3$—C nanocomposites, $FeF_3$—C nanocomposites, $FeF_3$—$Fe_2O_3$—C nanocomposites, $CuF_2$—C nanocomposites, CuO—$CuF_2$—C nanocomposites, LiF—Cu—C nanocomposites, LiF—Cu—C-polymer nanocomposites, LiF—Cu—CuO—C-polymer nanocomposites, LiF—Cu-metal-polymer nanocomposites, and many other porous nanocomposites comprising LiF, $FeF_3$, $FeF_2$, $MnF_3$, $CuF_2$, $NiF_2$, $PbF_2$, $BiF_3$, $BiF_5$, $CoF_2$, $SnF_2$, $SnF_4$, $SbF_3$, $SbF_5$, $CdF_2$, or $ZnF_2$, or other metal fluorides or their alloys or mixtures and optionally comprising metal oxides and their alloys or mixtures. In some examples, metal sulfides or mixed metal sulfides may be used instead of or in addition to metal oxides in such (nano)composites. In some examples, metal fluoride nanoparticles may be infiltrated into the pores of porous carbon (for example, into the pores of activated carbon particles) to form these metal-fluoride-C nanocomposites. In some examples, such composite particles may also comprise metal oxides (including mixed metal oxides or metal oxyfluorides or mixed metal oxyfluorides) or metal sulfides (including mixed metal sulfides). In some examples, mixed metal oxides or mixed metal sulfides may comprise lithium metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive.

In some examples, various intercalation-type active materials may be utilized instead of or in addition to metal oxides or metal sulfides. In some designs, such an intercalation-type active material exhibits charge storage (e.g., Li insertion/extraction capacity) in the same potential range as metal fluorides or in the nearby potential range (e.g., within about 1.5-4.2 V vs. Li/Li$^+$). In some examples, such metal oxides may encase the metal fluorides and advantageously prevent (or significantly reduce) direct contact of metal fluorides (or oxyfluorides) with liquid electrolytes (e.g., in order to reduce or prevent metal corrosion and dissolution during cycling). In some examples, nanocomposite particles may comprise carbon shells or carbon coatings. In some designs, such a coating may enhance electrical conductivity of the particles and may also prevent (or help to reduce) undesirable direct contact of metal fluorides (or oxyfluorides) with liquid electrolytes. In some designs, such fluoride-comprising (nano)composite particles may be used in nonlithiated, fully lithiated and partially lithiated states.

Conventional anode materials utilized in Li-ion batteries are also of an intercalation-type. The most common anode material in conventional intercalation-type Li-ion batteries is synthetic or natural graphite or soft carbon or hard carbon or graphite-comprising composites, mixture of carbons (including graphites), lithium titanium oxides (LTO), lithium vanadium oxides (LVO) and others. PVDF, carboxymethyl cellulose (CMC), alginic acid and their various salts (e.g., often Na or Li, etc.), polyacrylic acid (PAA) and their various salts (e.g., often Na or Li, etc.) are some of the most common binders used in these electrodes, although other binders may also be successfully used. Carbon black and carbon nanotubes are some of the most common conductive additive used in these electrodes.

Alloying-type anode materials for use in Li-ion batteries offer higher gravimetric and volumetric capacities compared to intercalation-type anodes. For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes in some designs. In addition, Si (and some Li—Si alloy compounds that may form during lithiation of Si) suffers from relatively low electrical conductivity and relatively low ionic (Li-ion) conductivity. Electronic and ionic conductivity of Si is lower than that of graphite. In some designs, formation of (nano)composite Si-comprising particles (including, but not limited to Si-carbon composites, Si-metal composites, Si-polymer composites, Si-metal-polymer composites, Si-carbon-polymer composites, Si-metal-carbon-polymer composites, Si-ceramic composites, or other types of porous composites comprising nanostructured Si or nanostructured or nano-sized Si particles of various shapes and forms) and their combinations may reduce volume changes during Li-ion insertion and extraction, which, in turn, may lead to better cycle stability in rechargeable Li-ion cells. In addition to Si-comprising nanocomposite anodes, other examples of such nanocomposite anodes comprising alloying-type active materials include, but are not limited to, those that comprise germanium, antimony, aluminum, magnesium, zinc, gallium, arsenic, phosphorous, silver, cadmium, indium, tin, lead, bismuth, their alloys, and others. In addition to (nano)composite anodes comprising alloying-type active materials, other interesting types of high capacity (nano)composite anodes may comprise metal oxides (including, but not limited to silicon oxide, lithium oxide, various sub-oxides, etc.), metal nitrides (including, but not limited to silicon nitride, various sub-nitrides, etc.), metal oxy-nitrides (including, but not limited to silicon oxy-nitrides), metal phosphides (including, but not limited to lithium phosphide and other metal phosphides and sub-phosphides), metal hydrides, and others as well as their various mixtures, alloys and combinations.

Organic solution-soluble or water-soluble binders are commonly used in electrode construction. In some designs, the amount of binder may be optimized for: a particular electrode active material (and its particle size distribution, specific surface area, shape, density, surface chemistry and/or other material parameters), conductive additives type(s) (and their particle size distribution, specific surface area, shape, density, surface chemistry and/or other material parameters) and relative amount, electrode density, capacity loading, final electrode thickness, calendaring (pressure rolling) conditions and/or other parameters. Excessive binder content in the electrodes (both anodes and cathodes), for example, may undesirably reduce volumetric capacity of the electrodes or reduce electrode porosity and increase tortuosity, thus negatively affecting energy density or power density or both. In some designs, excessive binder content and insufficient remaining pore volume may also induce premature failure due to excessively increased resistance growing during cycling. Finally, higher binder content may increase total material costs. Too little binder, on the other hand, may provide insufficient mechanical robustness to the electrode and induce premature electrode failure during cycling or delamination from the current collector in some designs. While the optimum content may vary greatly, electrodes in accordance with some designs may comprise from around 0.15 wt. % to around 15 wt. % of the binder.

In some designs, carbon nanotubes (e.g., multiwalled, double-walled, single-walled, etc.), carbon nanofibers and other one dimensional (1D) carbon materials, exfoliated graphite, graphene, graphene oxide (e.g., multiwalled, double-walled, single-walled, etc.) and other two dimensional (2D) carbon materials, carbon black or carbon onions and other zero dimensional (0D) carbon materials as well as various dendritic carbon and other structures three dimensional (3D) carbon materials may be effectively used as conductive carbon additives in electrode construction. In some designs, conductive oxide, carbide or metal(s) in the form of 0D, 1D and 2D materials (e.g., nanoparticles, nanofibers or nanoflakes) may be successfully utilized as conductive additives. In some designs, conductive additives and active particles may have an opposite charge. In some designs, conductive additives and/or active particles may have functional groups attached to their surface. In some designs, heating of the electrode after casting or calendaring may induce formation of chemical bonds between conductive additives and active particles. While the optimum content may vary greatly, electrodes in accordance with some designs may comprise from around 0.02 wt. % to around 10 wt. % of the conductive additives. In some designs, excessive content of conductive additives in the electrodes (both anodes and cathodes) may undesirably reduce volumetric capacity of the electrodes or increase pore tortuosity or increase first cycle losses, thus negatively affecting energy density or power density or both. Finally, higher content of conductive additives may increase total material costs. Too little conductive additives, however, may provide insufficient electrical connectivity within the electrode, reduce its mechanical stability and also reduce its power rate and increase electrode resistance in some designs.

As such, in some designs, it is generally desirable to reduce the amount of binder and conductive additives to the level where one or more other desired battery characteristics (e.g., sufficiently good mechanical stability, sufficiently low resistance, sufficiently high power, sufficiently good adhesion to the current collector foils, etc.) are attained for the desired application and application-specific specifications. As such, for each cell (with its specific electrolyte, active material type, electrode thickness and areal loadings, etc.), the amounts of both the binder and conductive additives may be optimized for particular applications. For example, thicker electrodes or electrodes with higher areal capacity loadings may require a larger fraction of binder and additives, which may be undesirable. Some aspects of the present disclosure provide means and methodologies to achieve a further reduction in the binder content (e.g., in some designs, a reduction in the conductive carbon additives content as well) without sacrificing important battery characteristics. Such reductions may not be feasible to achieve with conventional electrode fabrication processes (methods), particularly for thicker electrodes with high areal capacity loadings.

Copper or copper-containing/copper-based foil or mesh is typically used as a current collector for graphite, carbon or Si-based anodes for Li-ion batteries, and typically aluminum foil is typically used as a current collector for cathodes for Li-ion batteries and higher voltage anodes (such as LTO, among others). However, other metal current collectors, such as based on titanium, nickel, stainless steel, and other metals may similarly be used in some designs.

In some applications, in order to reduce the relative fraction of inactive materials (e.g., current collector foils, separators, etc.), it may be highly advantageous to produce relatively thick electrodes (e.g., in some designs, in the range from about 60 micron to about 1200.0 micron; in some designs—in the range from about 60 micron to about 800 micron; in some designs—in the range from about 60 micron to about 80 micron; in some designs—in the range from about 80 to about 100 micron; in some designs—in the range from about 100 to about 200 micron; in some designs—in the range from about 200 to about 400 micron; in some designs—in the range from about 400 to about 600 micron; in some designs—in the range from about 600 to about 800 micron; in some designs—in the range from about 800 to about 1,200.0 micron) that are also dense (e.g., with the porosity in the electrode (pores between active (e.g., Li ion storing) material particles, conductive additives and the binder) in the range from about 10 vol. % to about 30 vol. %, or, in some designs, below around 20 vol. % (e.g., about 0 vol. % to about 20 vol. %) or, in some designs, in the range from about 10 vol. % to about 20 vol. % or, in some designs, in the range from about 20 vol. % to about 30 vol. %). In some designs, depending on the volumetric capacity of active particles in the electrodes, relative content of the binder and conductive additives and the porosity, the areal loading of such electrodes may range from about 4.0 to about 1000.0 mAh/cm$^2$; in some designs from about 4.0 to about 6.0 mAh/cm$^2$; in some designs from about 6.0 to about 9.0 mAh/cm$^2$; in some designs from about 9.0 to about 15.0 mAh/cm$^2$; in some designs from about 15.0 to about 30.0 mAh/cm$^2$; in some designs from about 30.0 to about 60.0 mAh/cm$^2$; in some designs from about 60.0 to about 150.0 mAh/cm$^2$; in some designs from about 150.0 to about 300 mAh/cm$^2$; in some designs from about 300.0 to about 1000.0 mAh/cm$^2$).

Lower porosity in the electrode may increase volumetric capacity of electrodes and thus battery energy density, which is advantageous in some designs. However, in some designs, too low average porosity may reduce power density of the batteries (rate performance of electrodes) due to slower transport of Li ions during charging or discharging as the amount of highly ionically conductive electrolyte becomes small. In some designs, too high total average porosity may be undesirable because it may require a larger fraction of relatively expensive electrolyte and because it may reduce energy density of the cell. The overall average porosity in each electrode may be optimized for a particular cell design and application.

In some applications, thicker electrodes may be more difficult to densify than thinner electrodes. In addition, in an example, the thicker the dense electrodes are, the harder it may be to achieve uniform porosity in the electrode (or, more generally, desired distribution of the pore volumes throughout the electrode thickness). Thicker electrodes may also be harder to dry (or it may take undesirable long) while avoiding nonuniform stress-induced defects that result in inferior cell performance. Furthermore, in an example, the thicker the dense electrodes are, the harder it may be to achieve sufficiently high (for a given application) power density, sufficiently low (for a given application) resistance; sufficiently high (for a given application) charge rate performance and discharge rate performance of the electrodes, sufficiently long (for a given application) cycle stability, sufficiently good (for a given application) low temperature performance (e.g., in the temperature range from about minus (−) 70° C. to about −5° C.), sufficiently good (for a given application) adhesion to the current collector foils and sufficiently good (for a given application) cycle stability. One or more embodiments of the present disclosure are directed to overcoming some or all of the above-discussed challenges associated with making and using dense and thick electrodes while obtaining substantially improved performance characteristics (e.g., faster rates, lower total resistance, broader operational temperature range, longer cycle stability, etc.).

One conventional procedure to produce dense electrodes involves (i) electrode casting on current collector foils followed by (ii) pressure-rolling (also called "calendaring") of the casted electrodes to increase their density. Depending on the application and the tool setup, the diameter of the pressure rolling machine rolls may range from about 4" to about 8" for laboratory rollers; from about 8" to about 20" for the pilot scale rollers and from about 20" to about 60" for very large industrial production rollers. In some applications, larger diameters may result in a more uniform electrode densification. Too large of a diameter, however, may become too expensive to maintain and fix for some applications. In some designs, the thicker electrodes may be casted in multiple layers (one on top of another) to attain the desired electrode thickness while minimizing the drying time and drying-induced nonuniformities. In some designs, the pressure rolling may be applied multiple times in order to gradually achieve higher density in thick electrodes.

In conventional pressure rolling (calendaring), the electrodes may be heated in order to reduce viscosity of the binder and achieve denser electrodes. One conventional procedure involves heating the rollers to a sufficiently high temperature (e.g., in the range from about 50° C. to about 80° C.; in some designs—to higher temperatures) so that when the rollers touch the casted electrodes (not heated, initially at near room temperature), they transfer heat to the electrodes. This procedure results in heating the electrodes during calendaring and making the polymer binder in such electrodes more easily deformable. The initial temperature difference between the casted electrodes and the electrode-contacting part of the heated rollers may range from around 20° C. or more (e.g., in some designs, from around 20° C. to around 60° C.).

Unfortunately, conventional calendaring procedures may result in the formation of a much denser layer at the top portion of the electrode, which may slow down the ion transport and rate performance of thick and dense electrodes. One or more embodiments of the present disclosure are directed to overcoming this limitation via the addition of substantially uniform pores in the electrodes or making the top portion of an electrode more porous (as opposite to less porous) than the bottom part of the electrode, greatly enhancing the rate performance and stability of such electrodes (e.g., in some designs, electrodes exhibiting an areal capacity loading of more than about 4 mAh/cm$^2$). Similarly, one or more embodiments of the present disclosure are directed to making the bottom of the electrode (near the current collector foils) denser and better adhered to the current collector foils. As used herein, the "bottom" part of the electrode refers to the side of the electrode that interfaces with the current collector foils, with the "top" part of the electrode corresponding to the surface side of the electrode that interfaces with the pressure roller.

In one embodiment of the current disclosure, the electrode is preheated to temperature T1 before entering the calendaring tool so that the temperature of the calendaring tool rollers T2 is ranging from around 120° C. lower than T1 to around 20° C. higher than T1 (e.g., in some designs, the T2 may be from around 120° C. to around 80° C. lower than T1; in some designs, the T2 may be from around 80° C. to around 60° C. lower than T1; in some designs, the T2 may be from around 60° C. to around 40° C. lower than T1; in some designs, the T2 may be from around 40° C. to around 20° C. lower than T1; in some designs, the T2 may be from around 20° C. lower than T1 to around the same as T1; in some designs, the T2 may be from around the same as T1 to around 20° C. higher than T1). In the case where T2 is lower than T1, the temperature of the top of the electrodes (that touch the roller) may become lower than that of the bottom of the electrodes (that is attached to the current collector foil). As a result, the top of the electrode may become less prone to deformation and (after calendaring) less dense than the bottom of the electrode. In some applications, the higher porosity in the top layer of the thick electrodes may result in significantly faster rate performance and substantially lower resistance to ion transport when compared to conventional thick electrodes with the same average porosity. In addition, in some designs, such electrodes may be calendared to a lower total porosity (be denser) and comprise less average binder amount, while exhibiting the same or better rate performance, the same or better stability and the same of better adhesion to the current collector as conventional calendered electrodes.

Figure 2:
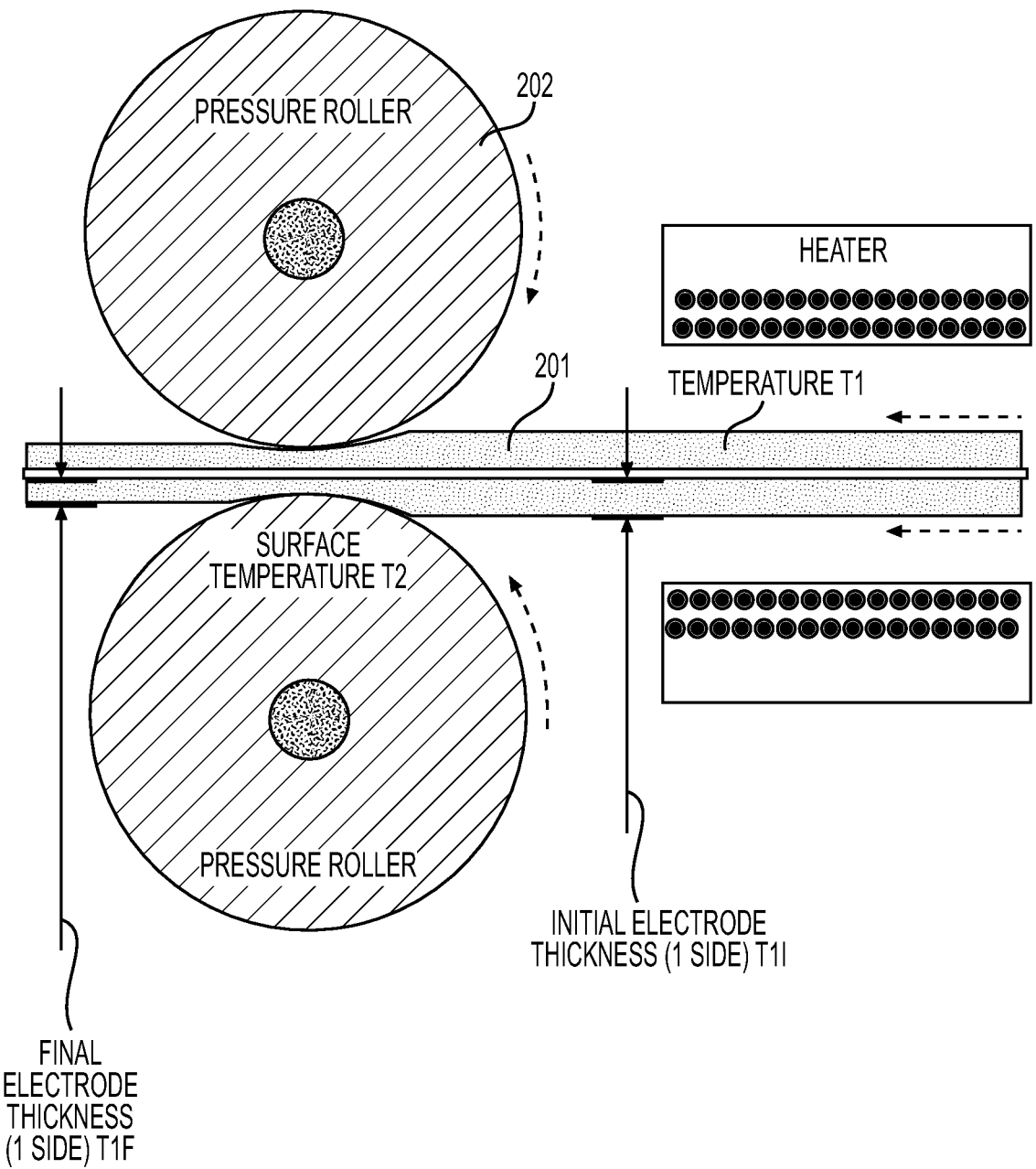
FIG. 2 illustrates an electrode produced in accordance with an embodiment of the present disclosure.

FIG. 2 illustrates an electrode 201 with the initial thickness of one side tli and initial temperature T1 is calendered (densified) to the final thickness of one side tlf by passing through a pressure-roller 202, the surface of which is kept to an average temperature T2 (e.g., where T2<T1) in accordance with an embodiment of the present disclosure.

In one or more embodiments of the present disclosure, the electrodes are heated nonuniformly prior to (or during) entering the densification (e.g., calendaring) tool so that the bottom portion of the electrodes (near the current collector foils) is heated to higher temperatures than the portion of the electrode near the electrode surface. In one example, one may utilize, for example, inductive heating (or, in some designs, resistive heating—through the current collector foils, for example) where the heat is mostly generated at the current collectors and then this heat from the current collectors is transported to the electrodes. As a result of the transient heat flow, the bottom portion of the electrode may attain a substantially higher temperature. In some designs, including a larger fraction or more conductive "conductive additives" near the bottom of the electrode may similarly enable stronger heating of the bottom (or bottom and central) portion(s) of the electrode compared to the top portion of the electrode.

In some designs, either DC (direct current) or AC (alternating current) or a combination of AC and DC currents may be utilized to heat the current collector. When the current collector foils are heated by using a resistive heating (e.g., passing current through the foil), a voltage drop may take place along the length of the foil in some designs (in other designs, it may, for example, the voltage drop may take place from one edge of the foil to another edge in a direction perpendicular to the length of the foil and parallel to the foil plane). In an example, if calendaring is conducted roll-to-roll, the foils are heated by a resistive heating and the current primarily flows along the foil length, the voltage drop (potential difference) may be applied, for example, between an initial coating roller(s) and one or more re/wind roller(s), in some designs. In some designs, the current may flow from the densification tool (e.g., calendaring tool) that is in a direct contact with the top surface of the electrode through the electrode towards the current collector foil (e.g., in the direction approximately perpendicular to the plane of the electrode) in order to heat the electrode. In this case, in order to more strongly heat a portion of the electrode near the current collector (bottom portion of the electrode, or central portion if factoring top/bottom electrodes which sandwich the current collector), it may be advantageous for this (bottom) electrode portion to have the higher resistance (e.g., comprise less conductive additives or more binder than the top portion of the electrode) in order to induce stronger local heating relative to the top part of the electrode. In some designs, the electric current direction may be reversed as well (e.g., either from the foil towards the top surface of the electrode, or from the top surface of the electrode towards the foil).

In an example, other methods or combinations of methods may similarly be used to achieve a lower temperature of the top of the electrodes during calendaring. In some designs, for example, the top layer of the electrodes may be intentionally cooled (e.g., by contacting a colder object or by convection/fan, other means, etc.). Accordingly, various methodologies may be deployed for making the top of the electrode colder than the bottom of the electrode (near the current collector foil) during the calendaring in order to reduce the deformation and retain a larger portion of the open pores (e.g., for faster ion transport) in the top layer of the electrode. In addition, this approach may permit part of the electrode (e.g., near the current collector) to be heated to higher temperatures and to apply higher average pressure in order to achieve better compaction of the electrode without significant reduction in the electrode rate performance or other important electrode characteristics.

Figure 3:
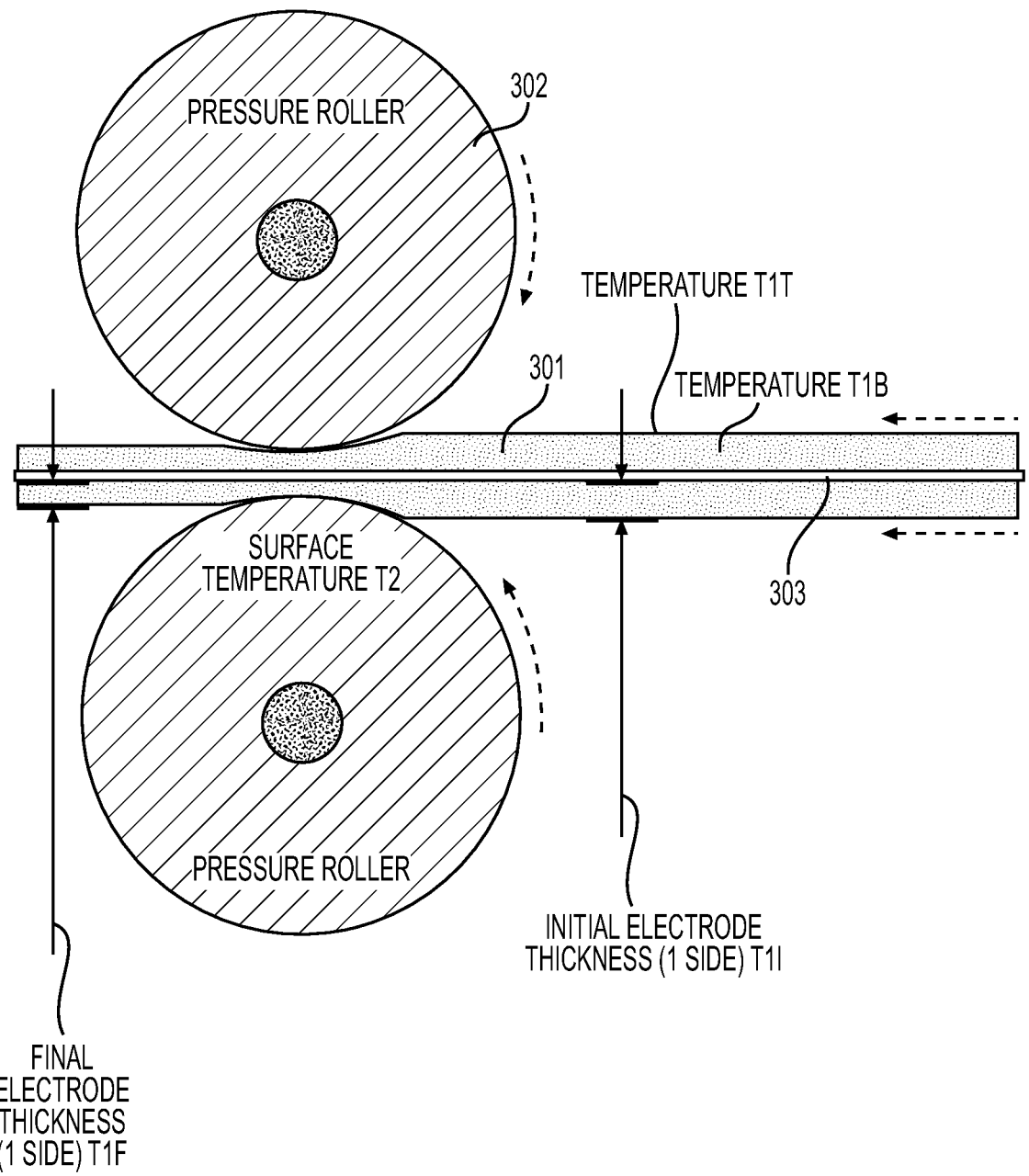
FIG. 3 illustrates an electrode produced in accordance with another embodiment of the present disclosure.

FIG. 3 illustrates an electrode 301 with the initial thickness $t1i$, initial temperature of the top layer of the electrode $T1t$ and the initial temperature of the bottom layer of the electrode $T1b$ ($T1b>T1t$) (near the current collector 303) is calendered (densified) by passing through a pressure-roller 302, the surface of which is heated to an average temperature T2 in accordance with an embodiment of the present disclosure. In some designs, it may be advantageous for the $T1b$ to be from around 10 to around 120° C. higher than $T1t$. In some designs, the temperature difference may be smaller than 10° C. but the positive impact may be lower (e.g., fewer or smaller resultant pores in the top part of the electrode, etc) Similarly, in some designs, the temperature difference may be larger than 120° C., but such a design may be more challenging and more expensive to implement, and, in some cases, it may induce formation of undesirable defects or modifications in the electrodes or the foils. In some designs, T2 may exhibit nearly the same temperature as $T1t$. In other designs, T2 may exhibit a lower temperature than $T1t$ (e.g., near room temperature) in order to further increase temperature difference between the top and bottom portion of the electrode. In some designs, T2 may exhibit a slightly higher temperature than $T1t$.

In some designs, the roller may be actively cooled during rolling in order to establish a consistently lower temperature than the top of the electrode. In an example, such active cooling may be provided by means of water-cooling, air cooling, Peltier cooling, among other means.

In yet another embodiment of the present disclosure, as discussed below with respect to FIG. 4, higher porosity in the top electrode layer may be attained by producing electrodes with variable binder content. In some designs, such an electrode may be produced by depositing multiple coatings with slightly different composition on the top of each other. In some designs, for example, the bottom portion of the electrode may comprise higher fraction of the binder than the top portion of the electrode and, after calendaring, retain smaller pore volume but provide stronger adhesion to the current collector.

Figure 4:
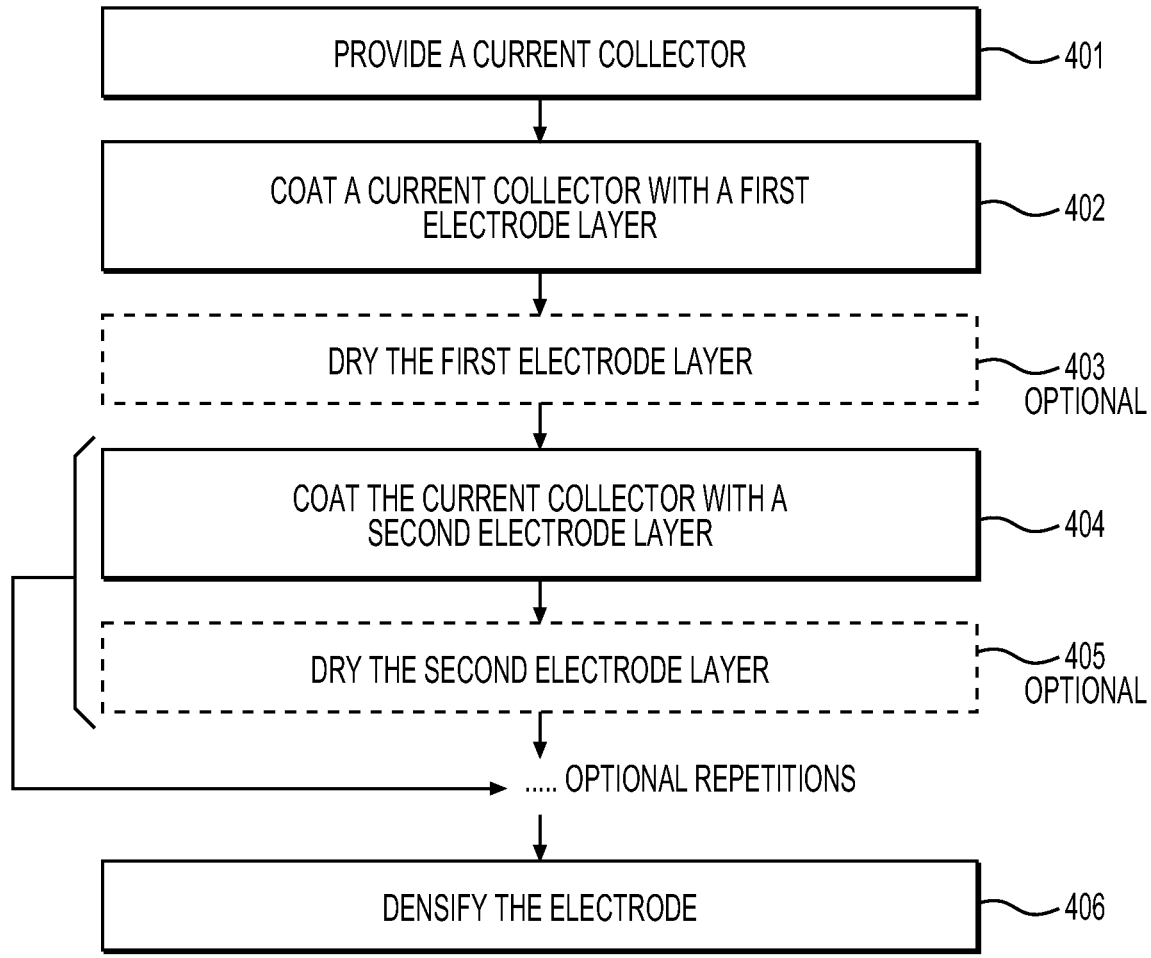
FIG. 4 illustrates a process of fabricating an electrode in accordance with an embodiment of the disclosure.

FIG. 4 illustrates a process of fabricating an electrode in accordance with an embodiment of the disclosure. A current collector is first provided (401) and then coated (402) with a first electrode layer at a certain thickness and composition (e.g., with specific amount and/or type or shape distribution or size distribution of active conductive additives, specific amount and/or type of binder, specific amount or size distribution or type of active material particles; specific amount and type of the solvent). In an example, the first electrode layer may directly contact the current collector. In an alternative example, one or more intervening electrode layers may be arranged between the current collector and the first electrode layer. The first electrode layer may then be (optionally) dried (403) and coated (404) with a second electrode layer at a certain thickness (e.g., same or different than the first electrode layer) and certain (e.g., different than the first electrode layer) composition) (404). The second electrode layer may then be (optionally) dried (405). Blocks 404 and 405 may then be optionally repeated a desired number of times (e.g., 0-100) to achieve a desired thickness and a desired number of layers of variable composition. In some designs, each successive electrode layer may vary in terms of composition, while in other designs two or more adjacent (or non-adjacent) electrode layers may have substantially the same composition. Additional stages may also be introduced into the process (densification), if needed. At 406, the final electrode may be calendered (densified) by passing the electrode one or more times through the pressure roller or other mechanism. In some designs, the final calendaring/densification stage 406 is conducted after the electrode is coated on the opposite side of the current collector (e.g., 401-405 are performed separately on each side of the current collector, after which 406 is performed for densifying the electrode on both sides of the current collector). In some designs, the calendaring may be conducted at intermediate electrode thicknesses (prior to the deposition of the final/top layer in between repetitions of 404-405). In some designs, the calendaring may be conducted both at intermediate electrode thicknesses as well as after the final/top layer is added. In some designs, the resultant densified electrode at 406 may capacity loading of more than about 4 mAh/cm$^2$.

In one or more embodiments of the present disclosure, it may be advantageous to use a different shape or different type/composition of the binder through the electrode thickness (e.g., in different electrode layers). For example, it may be advantageous to use more (e.g., plastically) deformable binder(s) or the binder(s) with a lower glass transition temperature (or lower melting point) in the part of the electrode near the current collector (bottom portion) in order to obtain higher density of the bottom electrode portion and better adhesion to the current collector. Similarly, it may be advantageous in some designs to use less (e.g., plastically) deformable (e.g., more rigid) binder(s) or the binder(s) with a higher glass transition temperature (or higher melting point) in the part of the electrode near the top surface (top portion) in order to obtain higher porosity and faster rate performance in the electrodes and cells. In an example, some binder(s) within the electrode may be in the form of dispersion(s) (e.g., nanofibers) and some binder(s) in the electrode may be in the form of solution(s). In some designs, it may be advantageous for the bottom portion of the electrode (near the foils) to comprise (e.g., more of) the solution-type binder (e.g., CMC solution in water or other aqueous binder solutions or nonaqueous binder solutions) that may form stronger adhesion to the current collector and for the top portion of the electrode to comprise (e.g., more of) the suspension-type binder (e.g., suspension of cellulose nanofibers or others) that may facilitate faster transport of electrolyte (less electrolyte blockage) after calendaring.

After electrode calendaring, a "spring-back" effect (expansion of the electrode to some level after the initial compaction) may take place. Different types of conductive additives and different amounts of conductive additives may impact the degree of spring-back. For example, carbon nanotubes or nanofibers used as conductive additives may result in a larger spring-back amount compared to carbon black conductive additives. Similarly, in an example, the larger amounts of nanotubes or nanofibers or, in some cases, larger diameter and/or length of the nanotubes and nanofibers, may result in a larger spring-back amount. In some designs, different types of nanotubes and nanofibers (e.g., different microstructures, compositions, etc.) may result in a different amount of spring-back. In one or more embodiments of the present disclosure, the top portion of the electrode may comprise a higher fraction or a different type of conductive additives than the bottom portion in order to result in a larger spring-back in the top electrode portion (e.g., and thus larger porosity and faster ion transport) after calendaring. In a further example, the bottom portion of the electrode may have a different composition and/or amount of additives to yield a smaller amount of springback so that smaller pore volume and stronger adhesion of the electrode to the current collector may be attained. Furthermore, by attaining relatively average small springback within the electrode, sufficiently low average electrode porosity and sufficiently high level of electrode smoothness may be attained.

Conventional electrode densification process involves an application of either a fixed force/pressure or (e.g., in case of the pressure rolling) a fixed smallest dimension of the gap between the pressure rollers. Such processes may be relatively inefficient such that multiple repetitions of the pressure rolling procedures may be employed in order to attain a desired low density (sufficiently small porosity), particularly in thick electrodes. Such repetitions may increase complexity and cost of the electrode fabrication. Furthermore, such processes may induce undesired damages to the electrode particles and may still provide insufficiently high average density for certain applications, and some of the large pores in the electrodes remaining there after the traditional calendaring/densification.

In one embodiment of the present disclosure, the pressure (in some designs, maximum pressure) applied to the electrode may advantageously be modulated (e.g., as a sinusoidal function or a square wave function or triangular wave function or other variable functions; in some designs—periodic, in others—aperiodic). The amplitude of the change may, for example, range from around 1% of the maximum pressure (or force) to around 50% of the maximum pressure (or force). In some designs, the amplitude may also change (e.g., increase; in some designs—gradually) during some period of the pressure application time (e.g., initially or in another time period). In some designs, the pressure may increase and decrease during different time periods (e.g., increase initially and then decrease; in some designs—gradually). In some designs, the average value of the applied pressure may also change (e.g., initially increase or eventually decrease; in some designs—gradually) during some period(s) of the time. A fixed frequency of the pressure modulation may be defined, whereas in other designs the frequency of the pressure modulation may vary across a range of frequencies. In an example, the optimal frequency (or range of frequencies) of a single modulation function for a particular application may depend on the properties of the electrode, binder and active material, the total electrode densification time and other factors, but may generally range from around 0.1 Hz to around 10 MHz. In some designs, avoiding a range of sound frequencies (e.g., from around 20 Hz to around 22 kHz) may be advantageous in terms of minimization of the hearable noise level in electrode production facilities (e.g., note that care should be taken to make sure proper personal protection equipment is used in facilities with excessive/harmful sound/noise and such use is carefully monitored). In some designs, the frequency of the modulation may change during the densification process.

In some designs, two or more distinct functions of pressure modulations may overlap for overall improved calendaring efficiency. In one illustrative example, a sinusoidal pressure wave having a relatively low amplitude (for example, in the range from around to around 0.001% to around 5% of the maximum applied pressure) of the uncalendared electrode thickness) and a relatively high frequency (for example, in the range from around 22 kHz to around 10 MHz) may overlap with a sinusoidal wave having a higher amplitude (e.g., in the range from around to around 5% to around 100% of the maximum applied pressure) and a lower frequency (for example in the range from around 0.1 Hz to around 20 Hz)) to improve overall densification efficiency.

In some designs, such processes of pressure modulation (application of a dynamic load instead) may facilitate a more efficient electrode densification (e.g., fewer pressure rolling repetitions or lower overall porosity achieved or fewer damaged particles) compared to the conventional process whereby uniform pressure is used. In addition, such processes of pressure modulation (application of a dynamic load) may facilitate less damage to the electrode particles, as such particles have more opportunities to move and adjust their position instead of cracking at the pressure concentration points.

Figure 5:
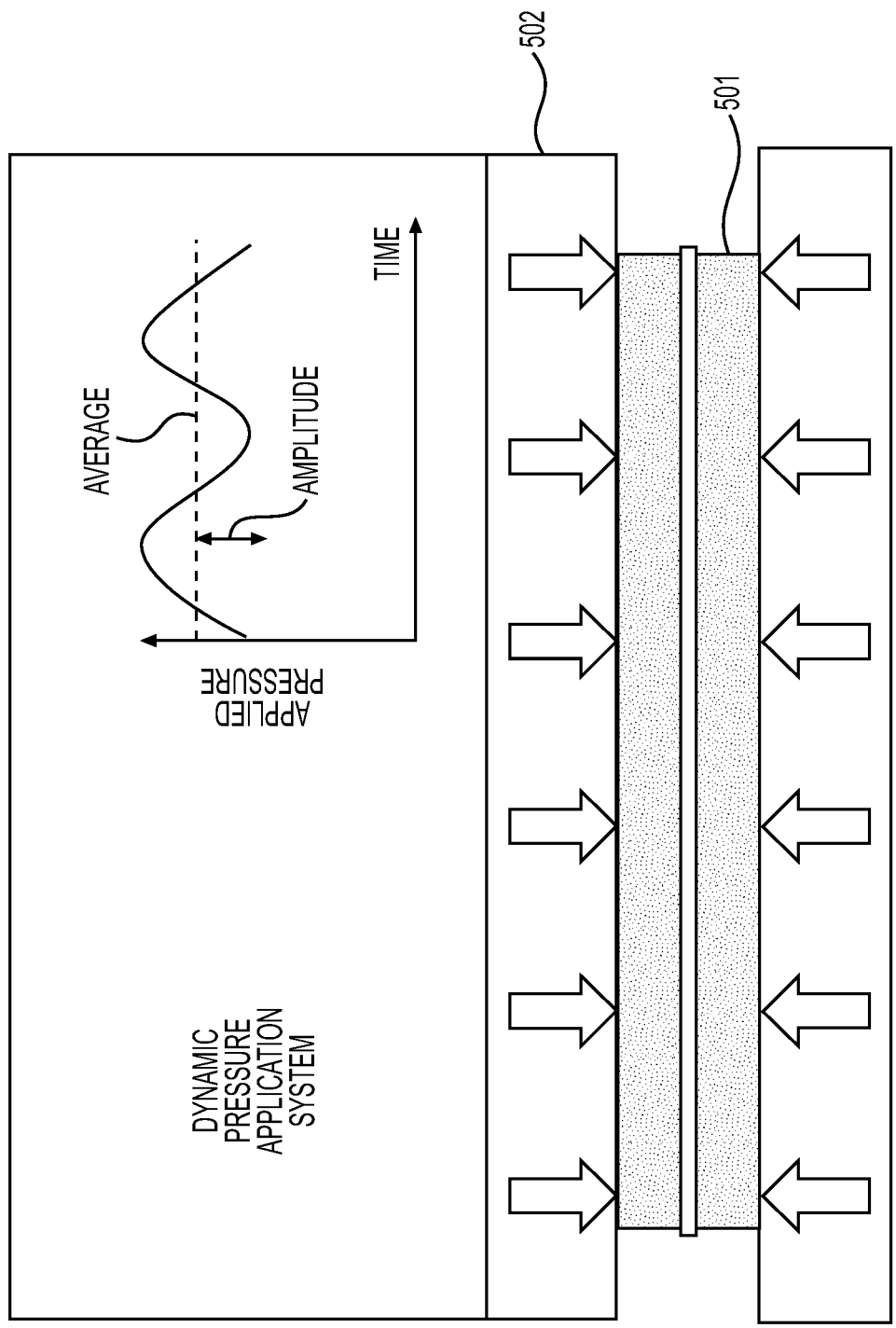
FIG. 5 illustrates an electrode produced in accordance with another embodiment of the present disclosure.

FIG. 5 illustrates an electrode 501 subjected to a dynamic (variable with time) pressure 502 during an electrode densification process in accordance with an embodiment of the disclosure.

In another embodiment of the present disclosure, the smallest separation distance between the pressure rollers (gap size) applied to the electrode during pressure rolling (calendaring) may advantageously be modulated (e.g., as a sinusoidal function or a square wave function or a triangular wave or other variable/dynamic functions which may be periodic or aperiodic). In some designs, the amplitude of the minimal separation distance (amplitude of the gap size variations) change may, for example, range from around 0.001% of the maximum (or uncalendared) electrode thickness to around 100% of the maximum (or uncalendared) electrode thickness (in some designs, from around 0.5% of the maximum or uncalendared electrode thickness to around 20% of the maximum or uncalendared electrode thickness). In some designs, the amplitude of the minimal separation distance change may, for example, range from around 25% of the average diameter of active electrode particles to around 20,000% of an average diameter of active electrode particles (in some designs, from around 50% to around 2000%). In some designs, in case of periodic functions that define the gap size, their frequency may generally range from around 0.1 Hz to around 10 MHz. In some designs, avoiding a range of sound frequencies (e.g., from around 20 Hz to around 22 kHz) may be advantageous in terms of the minimization of the noise level in electrode production facilities. In some designs, the frequency of the modulation may change during the densification process.

In some designs, two or more distinct functions of the distance/gap modulations may overlap for overall improved calendaring efficiency. In one illustrative example, a sinusoidal wave function having a relatively low amplitude (e.g., in the range from around to around 0.001% of the uncalendared electrode thickness to around 2% of the uncalendared electrode thickness) and a relatively high frequency (for example in the range from around 22 kHz to around 10 MHz) may overlap with a sinusoidal wave having a higher amplitude and a lower frequency (for example in the range from around 0.1 Hz to around 20 Hz)) to improve overall densification efficiency.

Figure 6:
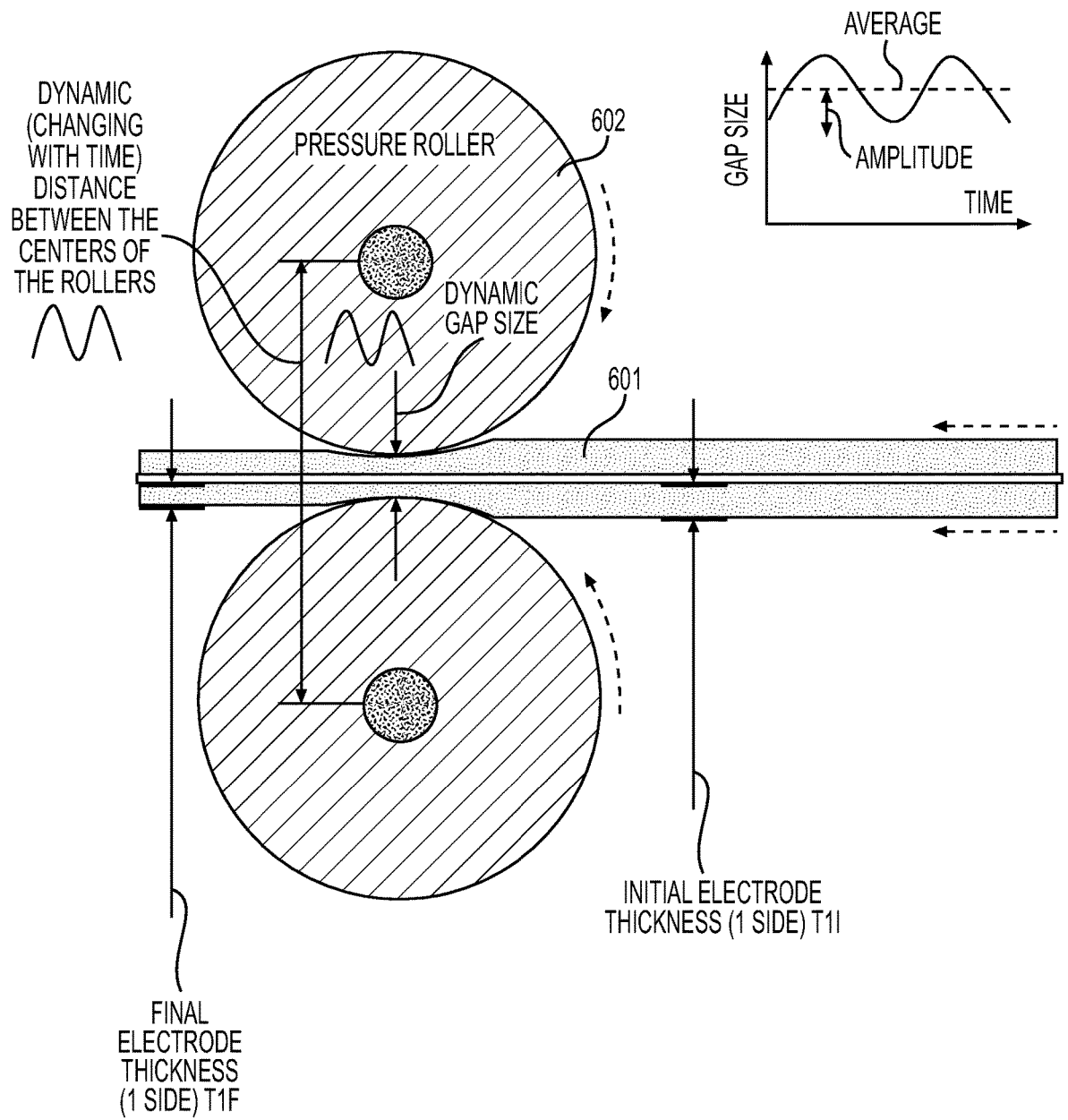
FIG. 6 illustrates an electrode produced in accordance with another embodiment of the present disclosure.

FIG. 6 illustrates an electrode 601 subjected to a dynamic (variable with time) gap size between pressure rollers 602 during an electrode densification process in accordance with an embodiment of the disclosure.

In one or more embodiments of the present disclosure, at least a portion of an electrode (e.g., a thick electrode) may comprise sacrificial material that may be removed (e.g., dissolved or evaporated) from the electrode after calendaring, thus opening pores in the densified electrode for faster ion transport. In some designs, such a sacrificial material may be introduced in the form of a solid(s) (e.g., powder, including nanopowder) or in the form of a solution during electrode slurry mixing (e.g., if wet electrode coating technology is used). In case of dry electrode coating technology, such a sacrificial material may be introduced in the form of a solid(s)/powder(s). In some designs, examples of the shape of a solid sacrificial material in the dried electrode may be: (nano)particles, (nano)fibers, (nano)flakes, (nano)ribbons, various interconnected objects, random shapes, among other shapes. In some designs, such a sacrificial material may be located primarily in the top portion of the electrode (e.g., about 5-50% from the top surface) in order to enhance the ion transport while keeping the total electrode porosity relatively small after sacrificial material removal. In some designs, the amount of the sacrificial material may range from around 0.01 wt. % to around 10.00 wt. % (relative to the total amount of solids in the dried electrode). In some designs, a temperature of the removal of the sacrificial material may range from around 0° C. to around 300° C. (in case when the sacrificial material is removed from the electrode by evaporation or by dissolution in a solvent). In some designs, a suitable composition of the sacrificial material may depend on multiple factors, including the composition of the binder, active material, conductive additives, temperature of the electrode casting, temperature of the electrode drying, use conditions of the electrodes in cells and other factors. Illustrative examples of suitable sacrificial materials may include, but are not limited to: various inorganic or organic salts (e.g., sulfate, thiosulfate, sulfite, nitrate, phosphate, acetate, formate, acetate, succinate, pyruvate, methanesulfonate and many others) of various metals (e.g., of Na, Ca, K, Mg, Li, Sr, Al or other metals) or ammonium, various soluble (e.g., in water or ethanol or acetone) organic compounds, water miscible (up to about 1-10 vol. %) organic compounds with a boiling point in the range from around 60 to around 300° C., high freezing point (e.g., >about 40° C.) solvents (e.g., naphthalene, camphor, lauric acid, phenol, etc.), among many others.

Figure 7A:
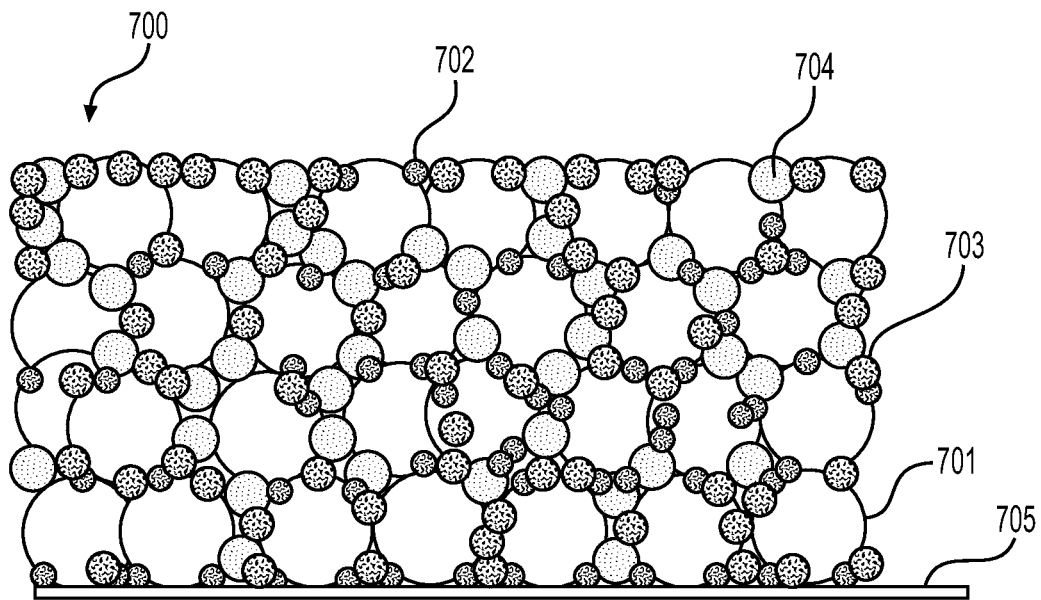
FIGS. 7A-7B illustrate a densified electrode before and after sacrificial material removal in accordance with an embodiment of the disclosure.
Figure 7B:
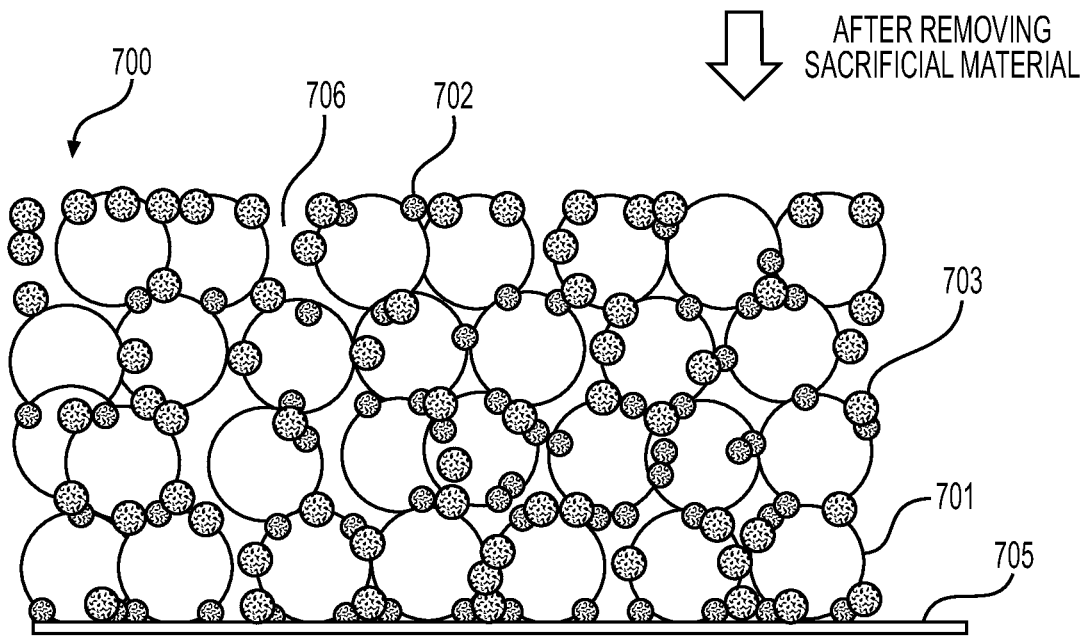

FIGS. 7A-7B illustrate a densified (calendered) electrode 700 before and after sacrificial material removal in accordance in an embodiment of the disclosure. In FIG. 7A, the densified (calendered) electrode 700 comprises active material 701, conductive additives 702, binder 703 and sacrificial material 704 coated on a current collector foil 705. For simplicity, only one side of the electrode is shown in this illustration. In FIG. 7B, after removing of the sacrificial material 704, pores 706 form, which enables faster ion transport in a battery cell.

In yet another embodiment of the present disclosure, it may be advantageous for the electrode to be coated by a layer comprising ceramic nanofibers (e.g., $Al_2O_3$ or $SiO_2$ or MgO or other metal oxides and their mixtures or other ceramic nanofibers that are sufficiently electrochemically stable in contact with the electrode surface during battery operation) prior to (final) calendaring. In some designs, such nanofibers may comprise Li or Na. In some designs, such nanofibers may be porous (e.g., with pores in the range from around 0.3 nm to around 100 nm). In some designs, such nanofibers may exhibit high Li ionic conductivity in excess of $10^{-5}$ S cm$^{-1}$ at room temperature (e.g., either because they become filled with a liquid electrolyte or because they are intrinsically conductive). In some designs, a ceramic nanofiber layer may also comprise some amount of a polymer binder (e.g., in order to improve their mechanical connectivity to each other) or other functional additives. Such a highly porous nanofiber-based coating may not only act as a thin (in some designs, e.g., from around 0.2 micron to around 12 micron in thickness) and highly ionically conductive separator, but may also adsorb some of the excess binder in the top electrode layer to prevent (or significantly reduce) formation of the dense, ion transport blocking layer in the top portion of the electrode during calendaring. In some designs, instead of nanofibers one may use porous or ionically conductive (and thus permeable to electrolyte) particles of other shapes (e.g., spherical, elliptical, random shape, dendritic, planar, etc.). In some designs, ceramic nanofibers may be electrically conductive or exhibit mixed (electronic and ionic) conductivity (in this case, a separator or a separator layer would still be needed to electrically separate anode in cathode). In some designs, instead of ceramic nanofibers, one may use conductive carbon or conductive metal nanofibers/nanowires/nanotubes, etc.

In yet another embodiment of the present disclosure, it may be advantageous for the electrode to comprise embedded (e.g., interconnected) porous tubes that provide fast ion transport. Diameter of such tubes may range, from around 20 nm to around 2000 nm (e.g., about 2 micron). In some designs, for example, such tubes may form some sort of a truss that could be placed onto a current collector foil prior to filling the spacing between the porous tubes with an electrode slurry. In some designs, such a truss may be used instead of the current collector foil. In some designs, some of the tubes would have orientation perpendicular to the electrode in order to enhance top to bottom electrolyte transport. In some designs, such porous tubes may be mixed into a slurry (e.g., prior to coating, drying and calendaring). In some designs, such porous tubes may be made electrically conductive (e.g., based on carbon, conductive oxides, metals, etc.).

In yet another embodiment of the present disclosure, it may be advantageous for the electrode slurry (and eventually the dry electrode) to comprise active (Li-ion storing) particles or granules with the polymer binder being (at least partially) chemically attached to such particles (or granules) so that during calendaring the binder does not flow away and does not block the pores (e.g., in the top portion) in the electrode. In some designs, the use of near-spherical granules (e.g., comprising from around 100 to around 1,000,000 individual particles and having dimensions from around 4 to around 400 micron; in some designs from around 4 to around 50 micron; in other designs, from around 50 to around 100 micron; in other designs, from around 100 to around 200 micron; in other designs, from around 200 to around 400 micron) instead of individual particles may also be advantageous as it may enhance the pore size between the granules and prevent (or reduce) pore blockage during calendaring. In some designs, it may be advantageous to use a combination of granules of different sizes in order to increase the volumetric capacity of the thick electrode (volumetric packing efficiency of the granules). In other designs, it may also be advantageous to use substantially uniform granules (e.g., with coefficient of variables of less than around 20%) in order to produce uniform electrodes with a high degree of ordering and high degree of uniformity. In some designs, such granulated electrode may utilize very mild calendaring or even no calendaring at all.

In conventional electrode fabrication, wet electrode coatings are dried by slowly moving the wet electrode coatings through large and long furnaces (typically heated to 60-120° C.) to ensure slow drying (e.g., within 3-30 min, typically within 4-20 min) on order to avoid formation of cracks ('mud cracks") or delamination from the current collector that may take place if the top of the electrode is dried first (due to air convection and due to being directly exposed to radiation), while the bottom of the electrode (near the current collector) is still wet. Longer heating time is typically required for thicker, higher areal loading electrodes. Such slow drying time not only increases production costs but may also lead to undesirable distribution of the binder within the electrode, where some of the pores within the electrode may become blocked by the binder or binder-conductive additive clusters. This situation may lead to substantially reduced power performance and stability and other undesirable outcomes. Some aspects of the present disclosure provide means and methodologies to overcome these limitations.

In one or more embodiments of the present disclosure, rapid electrode heating (e.g., about 1-120 sec; in some designs from about 1 to about 10 sec; in other designs from about 10 to about 30 sec; in other designs from about 30 to about 60 sec; in other designs from about 60 to about 120 sec) may advantageously be used on thick (e.g., in the range from about 60 micron to about 1200 micron), high areal capacity (e.g., 4.0 to about 1000.0 mAh/cm$^2$) electrodes. Very rapid solvent evaporation may prevent or greatly minimize the formation of pore blockages (by the binder) and/or may induce pore channels propagating perpendicular to the electrode orientation, which may be beneficial in some designs for maximizing electrode rate performance. Several methodologies may be utilized to avoid drying the top of the electrode first.

In some designs, the electrode (or electrode slurry) may be rapidly heated through contact heat transfer (conduction), where the bottom (or both the bottom and the top) of the electrode gets in a direct contact with hot object(s) (e.g., hot roll(s) or hot belt(s) or hot plate(s), etc.). The temperature of such objects may be very high (e.g., from around 80° C. to around 800° C.; in some designs, from around 80° C. to around 140° C.; in other designs, from around 140° C. to around 200° C.; in other designs, from around 200° C. to around 300° C.; in other designs, from around 300° C. to around 800° C.) and limited by the thermal or oxidation stability of the current collectors, electrode components and the exposure time (higher temperature may typically be applied for lower exposure time; please note that solvent evaporation cools down the electrode and its temperature may remain substantially smaller than that of the hot objects for some time). Since a slurry solvent (e.g., water in some designs) needs pathways to escape, at least the top of the electrode may contact either (i) a porous object (which may be heated in some designs) and through these pores at least a portion (or most or all) of the slurry solvent (e.g., water, in some designs) may be removed or (ii) have no direct contact with any object during rapid heating (drying). In some designs, the electrode slurry may be at least partially (e.g., partially, substantially or completely) dried so as to provide an at least partially dried electrode coating, which in some designs may comprise a residual amount of non-dried slurry solvent. In some designs, the electrode slurry may be heated through the current collector, another hot object, or a combination thereof. In some designs, an average temperature of the current collector and/or the hot object during the drying may exceed about 200° C. (e.g., in some designs, from around 200° C. to around 300° C.; in other designs, from around 300° C. to around 800° C.) and limited by the thermal or oxidation stability of the current collector and electrode components and the exposure time (higher temperature may typically be applied for lower exposure time; please note that solvent evaporation cools down the electrode and its temperature may remain substantially smaller than that of the hot objects for some time). In some designs, the coating and drying may be performed continuously (or semi-continuously), such as via roll-to-roll continuous electrode densification.

In some designs, a series of two or more hot objects heated to different temperatures may be used in series in contact with the electrode in order to effectively and rapidly dry the solvent, without over-heating some portion of the electrode, which may undesirably lead to degradation, oxidation or other unwanted outcomes. For example, the first hot object heated to a temperature T1 may dry majority of the solvent, while the second hot object heated to a temperature T2 (e.g., T2<T1) may further remove at least some of the remaining solvent without the danger of over-heating the electrode and, for example, undesirably reduce mechanical properties of the electrode coating or the binder or the current collector, etc. In some designs, three, four or more hot objects may be subsequently used. In some designs, a hot object (or a series of hot objects) may be heated to gradually changing temperature. In some designs, more dried electrode may get in contact with a colder portion of a hot object.

In some designs, the bottom of the electrode may be heated to a higher temperature (e.g., by about 20-200° C. or even more) than the top of the electrode during rapid drying. In some designs, only the bottom of the electrode may be heated during rapid drying. In some designs, there may be no contact of any object with the top of the electrode during rapid drying.

In some designs, the hot object(s) in a direct contact with the electrode may be electrically conductive. In some designs, the hot object(s) in a direct contact with the electrode may be heated resistively or inductively. In some designs, the hot object(s) in a direct contact with the electrode may comprise conductive carbon (e.g., conductive carbon fibers, conductive carbon felt, conductive carbon fabric, graphite paper/sheet or graphene or conductive carbon nanotubes, etc.) or metals. In some designs, if metals are used in the design of hot objects, they should be sufficiently corrosion resistant (e.g., nickel-containing foils or sheets or mesh or felt may be used in some designs).

In some designs, mechanical pressure may be applied to the electrode during rapid drying (e.g., somewhere from around 0.01 atm to around 1000 atm) to reduce or prevent small particles from escaping the electrode upon rapid solvent evaporation or otherwise to enhance mechanical integrity of the electrode by mitigating some of the internal stresses in the electrode coating induced by rapid heating. In some designs, both electrode drying and electrode calendaring (densification) may be applied at the same time.

In some designs, rapid electrode heating may be induced by resistive heating (e.g., by passing the electric current either through the current collectors or through the electrode or through the contacting objects and their various combinations, in some designs). In some designs, the current can be passed from the current collector through the electrode perpendicular to the top electrically conductive contact. In some designs, primarily the current collector may be heated (e.g., by radiation, by induction, resistively or by a combination of different approaches).

In some designs, such heat may be supplied inductively or resistively to the current collector and electrodes, similarly to the approaches described above for improved calendaring.

Conventionally, copper current collectors are used for most of Li-ion battery anodes and aluminum current collectors are used for most of Li-ion battery cathodes. Unfortunately, exposing both Cu and Al to elevated temperatures for a prolonged period may undesirably affect their properties. For example, Cu and Al may exhibit lower strength and become softer after a heat-treatment induced by the rapid drying or calendaring described in accordance with embodiments of the disclosure. The surface or grain boundaries within Cu may additionally corrode (oxidize) during exposure to high temperatures in the presence of water or other slurry solvents or air. Several strategies may be advantageously used in order to overcome some or all of such limitations. First, in some designs, a Cu current collector surface may be advantageously coated with a protective surface layer (e.g., made of conductive paint or a carbon layer or a metal or metal alloy (e.g., Ni) coating (e.g., electrodeposited or sputtered, etc.), etc.) which would protect Cu from undesirable corrosion. Second, in some designs, a current collector foil may comprise a layered structure, where layers of more mechanically strong, more thermally stable and more corrosion resistant materials (e.g., Ni, Ti, etc. and/or their various alloys) are altered with the layers of more electrically conductive materials (e.g., Cu for anodes or Al for cathodes and some of the higher voltage anodes). Third, in some designs, a temperature and a time of the rapid heat-treatment during rapid drying (or calendaring) may be optimized to minimize such negative outcomes to below the acceptable (for a given application and a given cell design) level. Fourth, in some designs, the current collector(s) may be strain-hardened to a sufficiently high level (e.g., to reduce grain size, to introduce more dislocation and other defects in order to increase current collector strength at the expense of reduced ductility) to account for the strain relaxation taking place during heating (which would increase their ductility to the acceptable level prior to assembling into cells). Fifth, in some designs, current collectors may be reinforced with nanoparticles or nanofibers, which may reduce their grain growth rates in order to maintain higher strength after heating. Other mitigating strategies may also be utilized.

In some designs, water-based slurries may be advantageously used for electrode (e.g., anode or cathode) formation (e.g., particularly when subjected to rapid heating) as these are environmentally benign and because water is not flammable.

In other designs, solvents with latent heat of evaporation lower than that of water (e.g., by about 2 times or more) or solvents with a surface tension lower than water (e.g., by about 2 times or more) (or both) or water-solvent mixtures may be used instead for the slurry coating. The use of nonaqueous solvent(s) (or solvent-water mixtures) may reduce oxidation of some current collectors (e.g., Cu) during rapid drying. The use of solvents with a lower heat of evaporation compared to water (in some designs, lower by about 2 times or more) may reduce energy consumption of the drying process. The use of solvents with lower surface tension than water (in some designs, lower by 2 times or more) may reduce stresses during drying and enhance mechanical properties or pore connectivity of the dried electrodes (e.g., particularly when subjected to rapid heating). Illustrative examples of low surface tension solvents include, but are not limited to, acetic acid, toluene, tetrahydrofuran, sym-tetrachloromethane, tert-butylchloride, propanol (methanol, ethanol, etc.), acetone, polydimethyl siloxane (baysilone m5), perfluoroheptane, perfluorohexane, perfluorooctane, nitroethane, undecane, octane, hexane, heptane, hexadecane (hdec), decane (dec), methyl ethyl ketone (mek), m-nitrotoluene, isobutylchloride, isoamylchloride, dichloromethane, dipropylene glycol monomethylether, decalin, p-cymene, cyclohexane, 1-decano, acetone (2-propanone), 1-chlorobutane, 1,2-dichloro ethane, among others. However, in some designs, a careful design of the rapid heating apparatus may be configured to greatly minimize (or preferably eliminate) the probability of fires (e.g., by ignition of the solvents during rapid heating) (e.g., utilizing designs with reduced $O_2$ content in the area where electrodes and solvents are exposed to elevated temperatures) and minimize the probability of solvent vapors escaping the exhaust and solvent recovery system and endangering the safety or health of humans or animals in the vicinity (e.g., utilizing designs that explores the use of gas blankets, negative pressure, seals, cold walls/condensers and other methods). In some designs, it may be preferable for the solvent to exhibit a flash point above around 21° C. and characterized as "flammable" (as opposed to "extremely flammable" and "highly flammable") (in some designs, above around 50° C.; in some designs, above around 90° C.). In some designs, aqueous solution of solvents (mixture of solvents and water) may be used to reduce their flammability or attain other benefits.

Figure 8A:
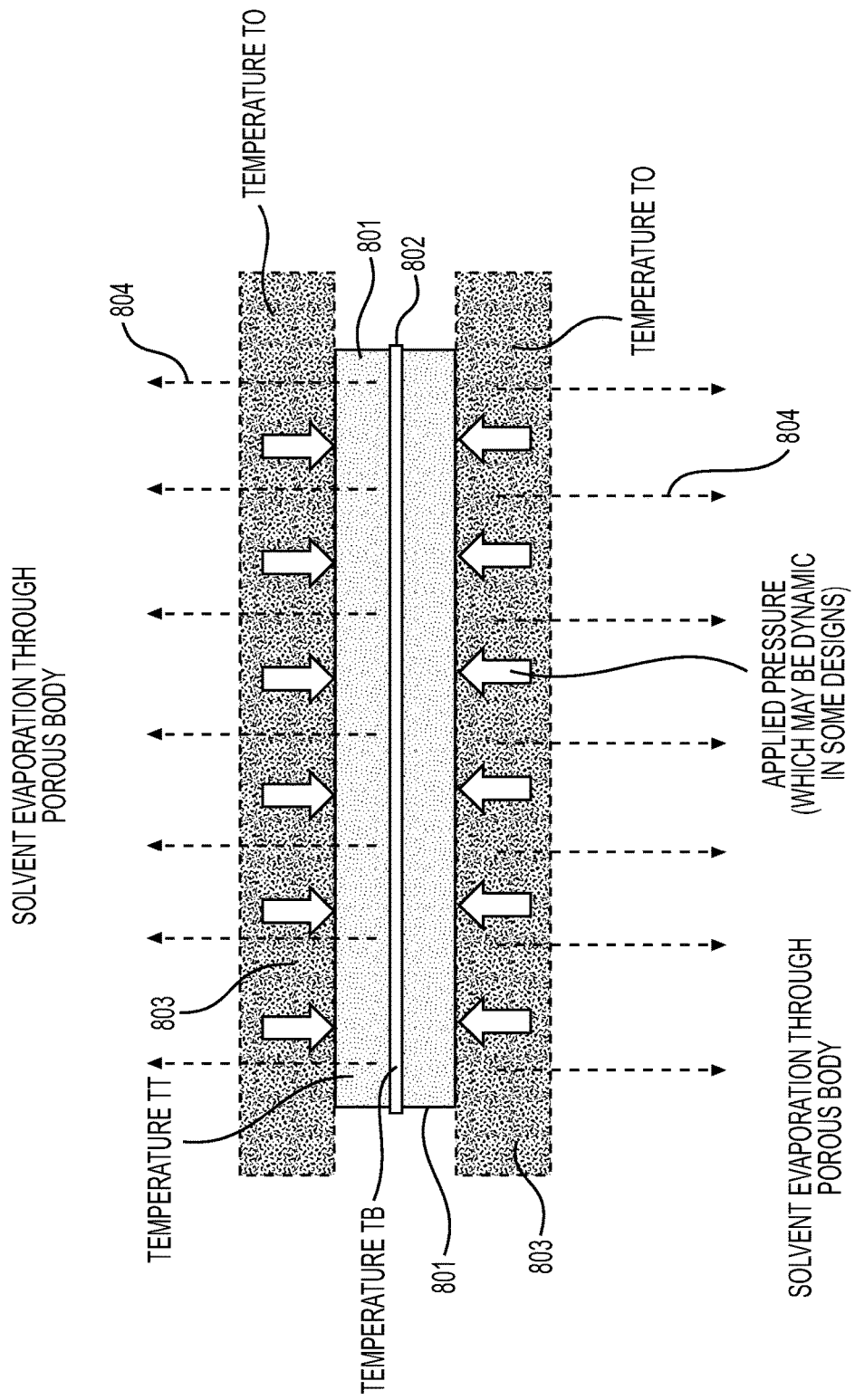
FIGS. 8A-8B illustrate an electrode dried in accordance with some embodiments of the present disclosure
Figure 8B:
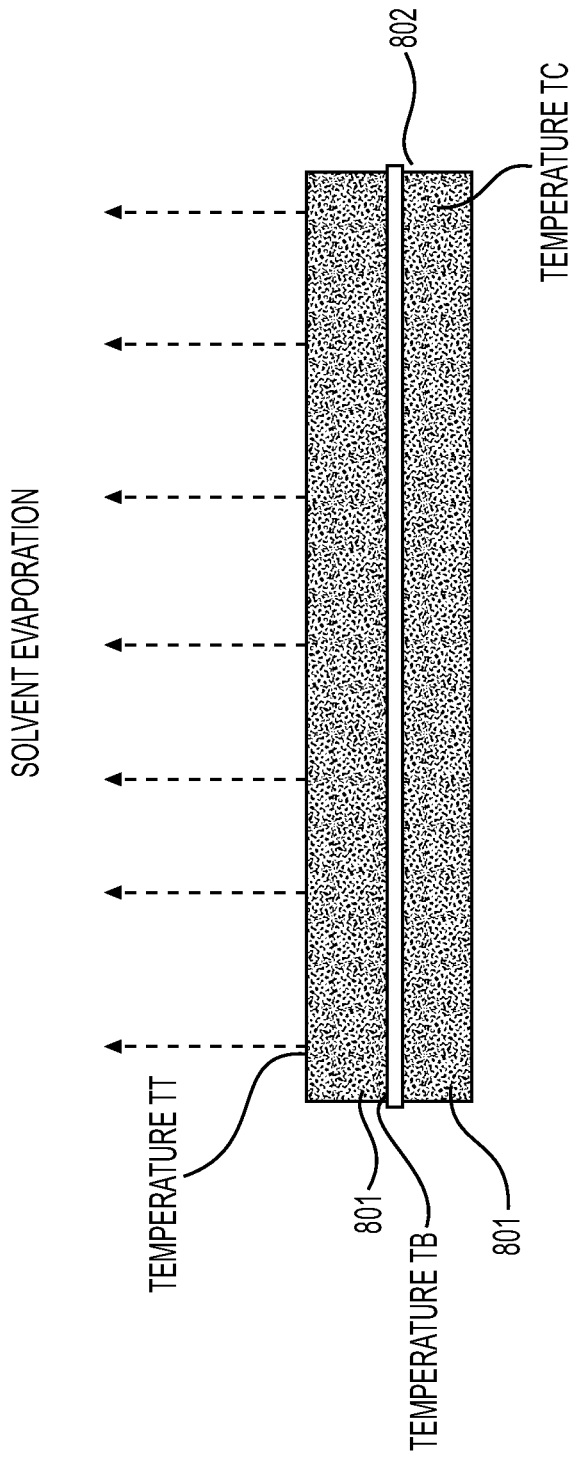

FIGS. 8A and 8B illustrate cross-sections of example slurry-casted electrodes subjected to a rapid heating to evaporate the solvent in accordance with embodiments of the disclosure.

In the illustrative example of FIG. 8A, a thick electrode coating 801 cast on a current collector 802 is arranged in contact with porous hot objects 803 on top/bottom sides of a current collector 802. In this example, the electrode (e.g., comprised of current collector 802 with top/bottom electrode coatings 801 arranged thereon) is symmetric and hot objects 803 touch both sides of the electrode. However, it will be appreciated that in some designs only one side of the electrode may be coated or only one side of the electrode may comprise a solvent. Transferring heat from the respective hot objects 803 to the respective top/bottom electrode coatings 801 quickly boils and evaporates the solvent 804, which may escape through the pores of the hot objects 803, in some designs, and be exhausted, while creating pore channels within the electrode to minimize its tortuosity. In some designs, pressure may be applied to the respective electrode coatings 801 from the respective hot objects 803 during heating. In some designs, such a pressure may be dynamic. In some designs, such a pressure may help to densify an electrode at the same time or avoid material losses or undesired roughening of the electrode. In some designs, the average temperature on the bottom of the electrode 803 near a current collector (Tb) may be lower, the same or higher than the average temperature on the top (e.g., the part of the electrode coating 801 further away from the current collector 802) of the electrode coating 801 near a respective hot object 803 (Tt) during rapid heating and solvent evaporation. In some designs, it may be advantageous to heat the current collector 802 (with or without simultaneous heating the porous hot objects 803) in order to ensure Tb is higher than Tt.

In an illustrative example of FIG. 8B, a thick electrode coating 801 cast on a current collector 802 is rapidly heated by the current collector 802. In this case an average temperature of the current collector Tc may be higher than an average temperature of the bottom of the electrode Tb, which, in turn, may be higher than an average temperature of the top of the electrode Tt during the rapid solvent evaporation. In this illustrative example of FIG. 8B, only one side of the electrode comprises a solvent that needs to be evaporated. In some designs, a porous object (not shown) may be in contact with a solvent-comprising electrode side in order to reduce surface roughening or mass losses or to enhance electrode density or to provide other useful functions to the produced thick electrode.

Figure 9:
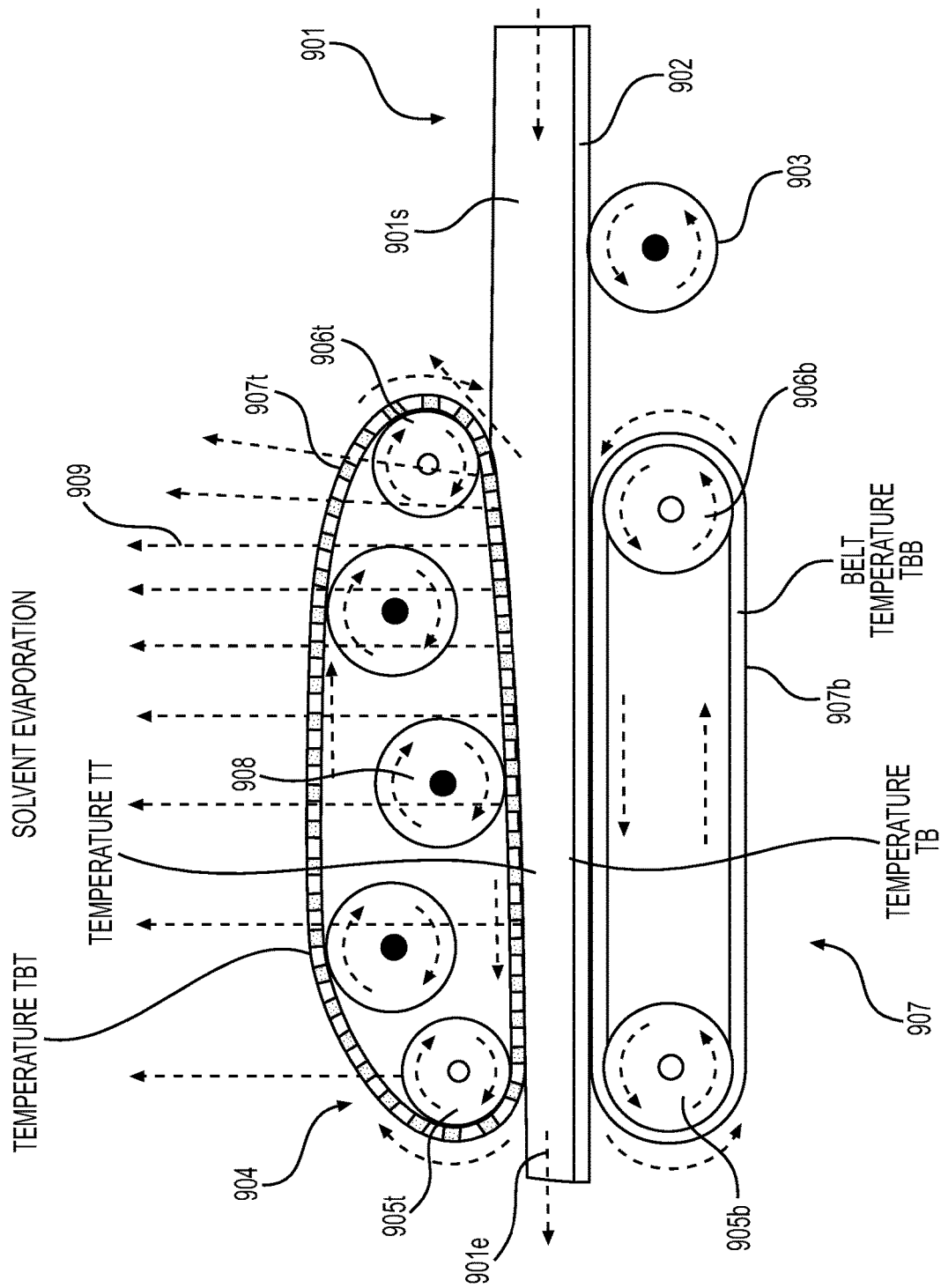
FIG. 9 illustrates an electrode dried in accordance with another embodiment of the present disclosure.

FIG. 9 illustrates another example of a slurry-casted electrode 901 subjected to a rapid heating to evaporate the solvent in accordance with an embodiment of the disclosure. In the illustrative example of FIG. 9, an electrode slurry 901s is cast only on one side of a current collector 902. During rapid drying utilizing an example embodiment, the initial electrode slurry 901s becomes drier and denser 901e after the electrode slurry 901s passes through a heated belt setup 904. Such a setup may have two sides touching both a coating side being dried and the opposite side of the electrode (e.g., the current collector 902, or a pre-dried electrode side). During rapid drying the coating thickness of the electrode slurry 901s may gradually get reduced. Rollers 903 may be used to move the electrode during drying and densification processes. Rollers 905, 906 and 908 may be used to move heated belt 907t. In some designs, a potential difference between some of the conductive rollers (e.g., between the rollers 905t and 906t of one side of the heated belt setup or between the rollers 905b and 906b of another side of the heated belt 907t setup or both) may be used to conduct the current through one portion of the heated belt 907t or the other portion of the heated belt 907b or both, thereby heating it to the desired temperature. In some designs, the temperature of one side of the belt setup that is in a direct contact with a solvent-comprising electrode side (TBt) may be lower than the temperature (TBb) of the other side of the belt setup that is in a direct contact with the opposite side of an electrode (e.g., a current collector 902, or a pre-dried electrode side). In this case, the average temperature of the bottom of the electrode Tb may be higher than an average temperature of the top of the electrode Tt. In some designs, the heated belt 907t that is in contact with a solvent-comprising electrode side may be porous to enable slurry solvent 909 to evaporate and be exhausted.

In conventional electrode fabrication, electrodes are fully dried before calendaring and before assembling into the jellyroll or stack for insertion into the case (or pouch) and electrolyte filling. However, as previously described drying thick (e.g., about 60-1200 micron), high loading (e.g., about 4.0 to about 1000.0 mAh/cm$^2$) electrodes may induce undesirable stresses and defects, which may undesirably reduce cohesion or adhesion to the current collector or may undesirably increase tortuosity, thus resulting in reduced rate performance or stability or both. Some aspects of the present disclosure provide mechanisms and methodologies to overcome these limitations.

In some designs, not fully drying the electrode and retaining a fraction of the slurry (electrode paste) solvent (e.g., leaving from around 0.5 vol. % to around 25 vol. % solvent relative to the total final electrode volume; in some designs from around 0.5 vol. % to around 5 vol. %; in other designs from around 5 vol. % to around 15 vol. %; in other designs from around 15 vol. % to around 25 vol. %) after partial drying or (in some designs) even after calendering (electrode densification) may advantageously enable lower tortuosity and substantially reduced tensile stresses that may enable better rate performance or better stability of cells. In some designs, calendering may be conducted at room temperature or at moderate temperatures (e.g., about 20-60° C.) on these not fully dried electrodes. In some designs, the slurry solvent may comprise a component of the electrolyte (e.g., a carbonate or an ether or a sulfone, etc., which may be fluorinated in some designs). In this case the not fully dried electrode(s) and the separator may be assembled into sandwich stacks or jelly rolls, inserted into a pouch or a case and filled with the remaining components of the electrolyte prior to formation and using the cells. In some designs, the slurry solvent may comprise a component of the electrolyte that is solid at near room temperature (has a melting point above or around 20° C.). For example, ethylene carbonate (EC), a very common and suitable component of the Li-ion battery electrolytes has a melting point of about 34 to about 37° C. and may be made part of the slurry solvent. Other common and suitable high-melting point electrolyte solvents include, but are not limited to: vinylene carbonate (VC, melting point 22° C.), 4-Fluoro-1,3-dioxolan-2-one (FEC, melting point 18-23° C.), vinyl ethylene carbonate (VEC, melting point 22° C.), ethyl methyl carbonate (EMC, melting point 26-27° C.), to name a few. In some designs, the solvent of the electrode slurry may comprise a mixture of two and more solvents with distinctly different melting points (e.g., by about 20-200° C.) and vapor pressures (e.g., by about 2-20,000 times at about 60-200° C.). In some designs, one or more solvent of the electrode slurries may preferentially evaporate, leaving (e.g., majority of) one or more other solvents in the not fully dried electrodes prior to calendaring or prior to cell assembling.

Figure 10:
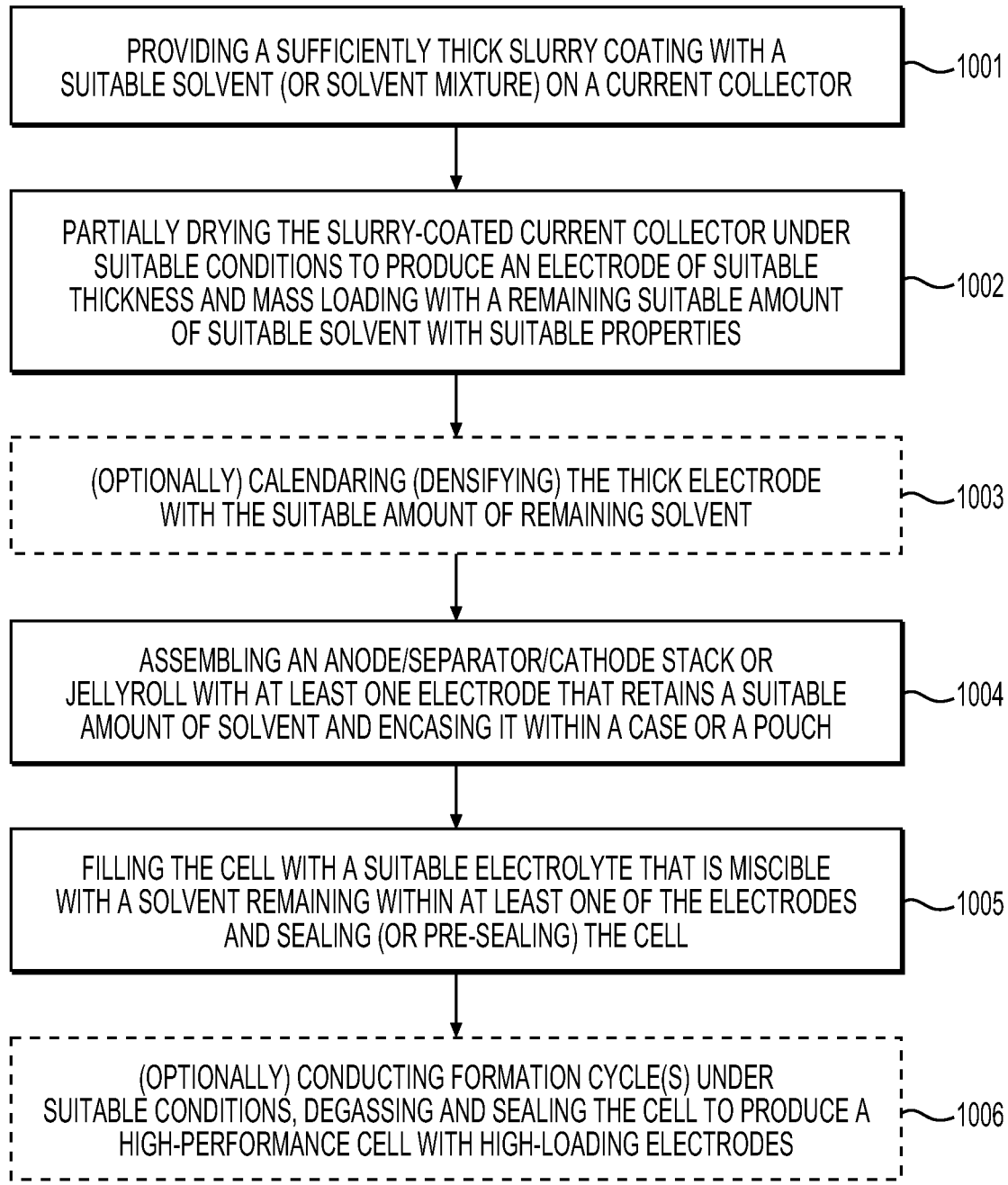
FIG. 10 illustrates a method of producing a cell in accordance with an embodiment of the present disclosure.

FIG. 10 illustrates a method of cell manufacturing with at least one not fully dried electrode in accordance with an embodiment of the disclosure. In this illustrating example, a suitable slurry of suitable thickness is first cast on a current collector (1001). This slurry is then only partially dried, leaving a suitable portion of the electrode slurry solvent (or a portion of the initial mixture of slurry solvents) distributed within the pores of a thick electrode (1002). The presence of such remaining solvent reduced internal stresses within the electrode during partial drying, which may improve its properties. The produced thick, high-loading electrode may then optionally be calendered (further densified, 1003). In some designs, calendering may be done hot or cold. In some designs, dynamic force may be applied during calendaring. In some designs, at least a portion of the remaining solvent may remain in the electrode after calendaring. The presence of such remaining solvent may prevent or greatly reduce formation of closed or highly torturous pores. The electrode stack or jellyroll may then be assembled where at least one electrode (e.g., an anode or a cathode or both) may comprise remaining solvent and enclosed within a rigid or solid cell case (or pouch) (1004). At room temperature, such a solvent may be in a solid state (e.g., if it exhibits a melting point above a room temperature). The cell then may be filled with electrolyte miscible with a remaining solvent to form a desired electrolyte composition and may be sealed (or pre-sealed) (1005). Finally, the cell may optionally be subjected to a formation cycle at the desired temperature (e.g., in some designs, under pressure), degassed and fully sealed to form a high-performance (e.g. high-rate or high stability or low temperature performing) cell with high-loading electrodes (1006).

Figure 11A:
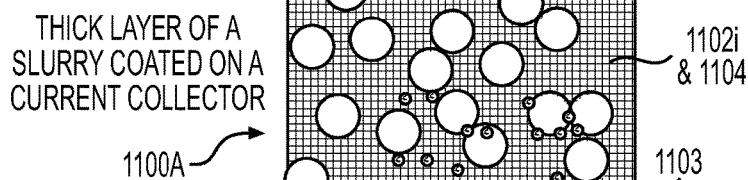
FIGS. 11A-11E illustrate a building block of a cell with thick, high loading electrodes produced staring from a slurry cast on a current collector, before and after being partially dried to form a solvent-comprising electrode, before and after being densified to form a solvent-comprising dense electrode, before and after being assembled into a stack with a solvent-comprising dense electrode, before and after being filled with electrolyte in accordance with an embodiment of the disclosure.
Figures 11B, 11C:
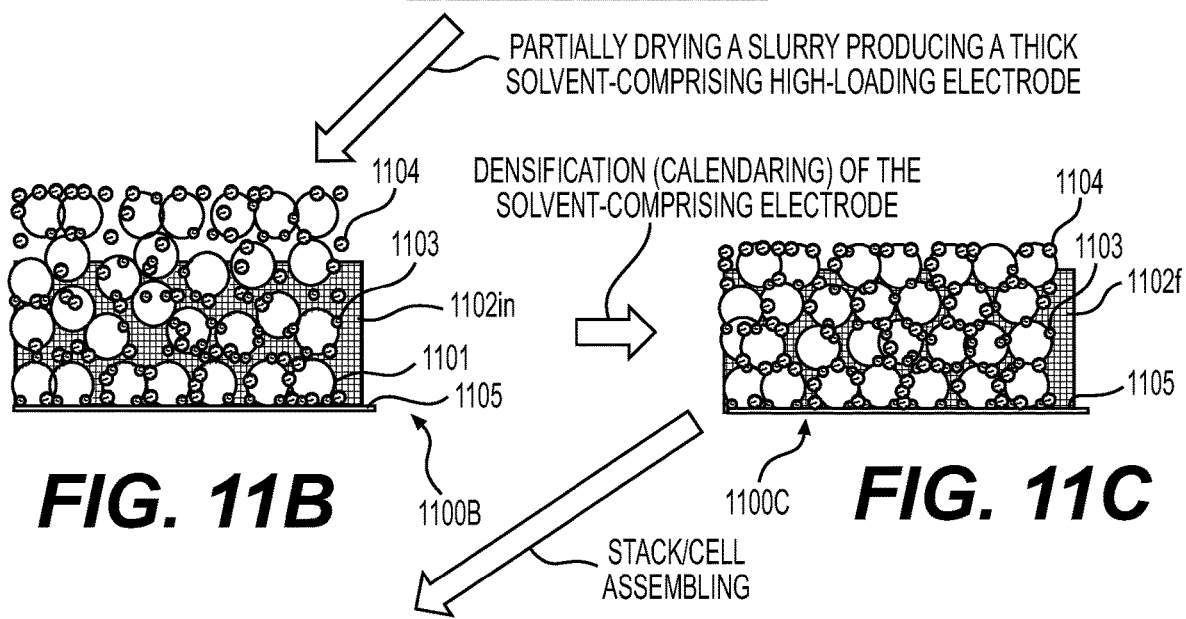
Figures 11D, 11E:
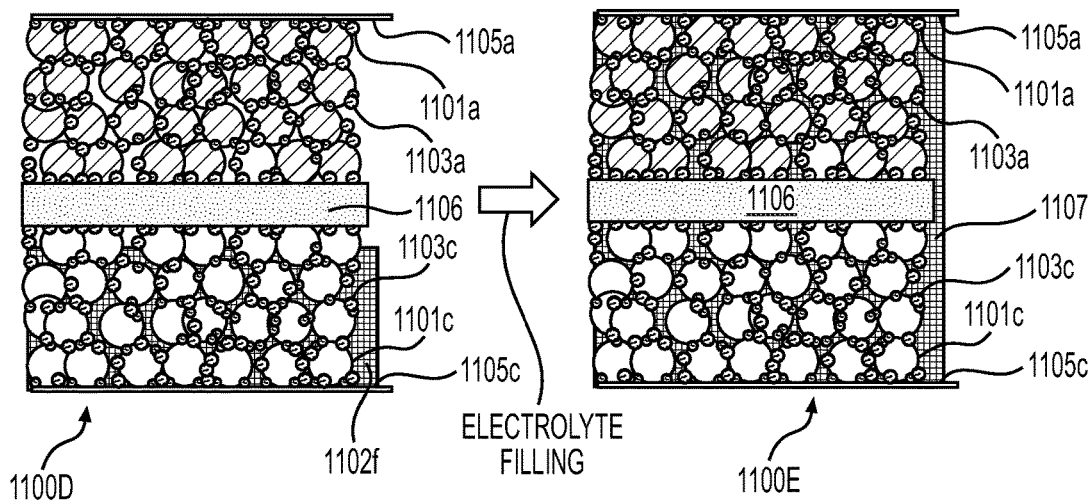

FIG. 11A-11E illustrate exemplary formation of a building block of a cell with thick, high loading electrodes produced according to one of the embodiments of the present disclosure. FIG. 11A illustrates exemplary slurry 1100A comprised of active particles 1101, conductive additives 1103 and an initial solvent 1102$i$, which may additionally comprise a dissolved or dispersed binder 1104, cast on a current collector 1105. FIG. 11B illustrates a slurry 1100B after partially drying of the slurry 1100A and forming a layer of active materials 1101 intermixed with conductive additives 1103 and binder 1104 coated on a current collector 1105, where an intermediate portion 1102$i$ of the solvent (or a portion of the initial solvent mixture) remains in the pores of the coated layer. FIG. 11C illustrates a coating 1100C after densification (calendering; in some designs conducted at elevated temperatures and in some designs conducted at near room temperature; in some designs produced by dynamic loading) of the slurry 1200B, where densely packed active material particles 1101 are intermixed with conductive additives 1103 and binder 1104 coated on a current collector 1105, where a final portion 1102$f$ of the solvent (or a portion of the initial solvent mixture) remains in the pores of the coated layer. FIG. 11D illustrates a repeat unit stack 1100D of a battery cell with high loading electrodes, where at least one of the electrodes (in this example, a cathode) comprises some of the solvent in its pores. Here, the anode current collector 1105$a$ is coated with anode active materials 1101$a$ mixed with conductive additives 1103$a$ and a binder; the cathode current collector 1105$c$ is coated with cathode active materials 1101$c$ mixed with conductive additives 1103$c$ and a binder and where solvent 1102$f$ remains in at least a portion of the cathode pores. The anode and the cathodes are electrically separated with a porous separator 1106. FIG. 11E illustrates a repeat unit stack 1100E of a battery cell with high loading electrodes produced by filling the pores remaining in the unit stack of 1100D of the FIG. 11D with an electrolyte miscible with a solvent 1102$f$ to produce a final electrolyte composition 1107.

In some designs, various disclosed embodiments of thick electrode drying, thick electrode calendaring or using not fully dried thick electrodes in cell construction may be either utilized separately or advantageously combined.

Some aspects of this disclosure may also be applicable to electrodes with medium capacity loadings (e.g., in the range from around 2 to around 4 mAh/cm$^2$).

High capacity, high energy batteries (e.g., cells with energy density in excess of around 10 watt-hours (Wh); preferably in excess of about 15 Wh; in some designs, in excess of about 30 Wh; in some designs, in excess of about 100 Wh; in some designs, in excess of about 200 Wh) may particularly benefit from various aspects of this disclosure because such batteries are typically harder to dry and produce and may suffer particularly strongly from the above-discussed limitations of certain conventional methodologies.

High-energy density Li-ion batteries (e.g., cells with energy density in excess of about 600 Wh/L; in some designs in excess of about 700 Wh/L; in other designs in excess of about 800 Wh/L; in other designs in excess of about 900 Wh/L; in other designs in excess of about 1000 Wh/L) with high-areal loading electrodes may particularly benefit from various aspects of this disclosure because such batteries are typically harder to dry and produce and may suffer particularly strongly from the above-discussed limitations of certain conventional methodologies (including, but not limited to low rate performance or fast degradation or both).

High-power density Li-ion batteries (e.g., cells with power density in excess of about 1000 Wh/L; in some designs in excess of about 1600 Wh/L; in other designs in excess of about 3000 Wh/L, when measured at around 40° C.) particularly with high-areal loading electrodes (e.g., about 4 mAh/cm$^2$) may particularly benefit from various aspects of this disclosure because such batteries are typically harder to dry and produce and may suffer particularly strongly from the above—discussed limitations of certain conventional methodologies.

Li-ion battery cells that require fast charging (e.g., wherein the cell may be charged from around 10% state of charge to around 80% state of charge within about 20-30 min or less (in some designs within about 15 min or less) when charged at around 40° C.) particularly with high-areal loading electrodes (e.g., 4 mAh/cm$^2$) may particularly benefit from various aspects of this disclosure because such batteries are typically harder to dry and produce and may suffer particularly strongly from the above-discussed limitations of certain conventional methodologies.

Li-ion battery cells that require fast discharging (e.g., wherein the cell is configured to discharge about 80% or more of its maximum stored energy within about 20 minutes or less when discharged at around 40° C.) particularly with high-areal loading electrodes (e.g., 4 mAh/cm$^2$) may particularly benefit from various aspects of this disclosure because such batteries are typically harder to dry and produce and may suffer particularly strongly from the above-discussed limitations of certain conventional methodologies.

Li-ion batteries comprising conversion-type anode materials, such as alloying-type anode materials (such as those comprising Si or Li alloying elements) or Li metal anodes, may particularly benefit from various aspects of this disclosure because such batteries may become cathode-limited in performance and thickness. In some designs, Si may advantageously be a part of the composite particles. In some designs, the weight fraction of Si may range from around 5 wt. % to around 80 wt. % as compared to the total weight of the electrolyte-free electrode (e.g., anode) coating (not counting the weight of the current collector). In some designs, it may be advantageous for the anode to comprise carbon in order to enhance its electrical conductivity, enhance its mechanical properties or provide other benefits. In some designs, the electrode (e.g., anode) may comprise silicon (Si), carbon (C), or a combination of Si and C. In some designs, the electrode (e.g., anode) may comprise Si-containing composite (e.g, nanocomposite) particles.

Li-ion batteries comprising dense electrodes (e.g., anodes with porosity of less than around 30 vol. %; in some designs less than around 20 vol. %; in some designs less than around 15 vol. %; or cathodes with porosity of less than around 20 vol. %; in some designs less than around 15 vol. %; in some designs less than around 10 vol. %) particularly with high-areal loading electrodes (e.g., 4 mAh/cm$^2$) may particularly benefit from various aspects of this disclosure because such batteries are typically harder to dry and produce and may suffer particularly strongly from the above-discussed limitations of certain conventional methodologies.

Li-ion batteries comprising thick electrodes (e.g., wherein the average thickness of the one side of the densified electrode coating ranges from around 60 to around 800 micron, not considering the thickness of the current collector) may particularly benefit from various aspects of this disclosure because such batteries are typically harder to dry and produce and may suffer particularly strongly from the above-discussed limitations of certain conventional methodologies.

Electrode coating and drying or electrode densification conducted on suitable electrode materials according to methodologies and tools described in various aspects of this disclosure may become particularly attractive if it is conducted continuously (or semi-continuously), such as via roll-to-roll continuous electrode densification.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method of electrode manufacture, comprising:
depositing a pre-calendering electrode layer onto current collector foils to produce a pre-calendering electrode, the pre-calendering electrode layer comprising an active material with an areal capacity loading of at least about 4 mAh/cm$^2$, a binder, and conductive additives; and
calendering the pre-calendering electrode via one or more pressure rollers that comprise one or more respective surfaces that exhibit an average temperature T2 to produce a calendered electrode with a densified electrode layer,
wherein:
the pre-calendering electrode exhibits an average temperature T1 prior to the calendaring,
the pre-calendering electrode layer exhibits a first porosity and a first density,
the densified electrode layer exhibits a second porosity that is less than the first porosity,
the densified electrode layer exhibits a second density that is greater than the first density, and
the average temperature T2 ranges from around 120° C. lower than T1 to around 20° C. higher than T1.

2. The method of claim 1, further comprising:
after the depositing and before the calendering, preheating the pre-calendering electrode to the average temperature T1.

3. The method of claim 1, wherein the average temperature T2 is less than the average temperature T1.

4. The method of claim 1, wherein at least part of the one or more respective surfaces of the one or more pressure rollers contacts a surface of the pre-calendering electrode during the calendering.

5. The method of claim 1, wherein a temperature difference between the average temperature T1 and the average temperature T2 ranges from about 20° C. to about 40° C.

6. The method of claim 1, wherein a temperature difference between the average temperature T1 and the average temperature T2 ranges from about 40° C. to about 60° C.

7. The method of claim 1, wherein the conductive additives comprise: (i) carbon nanotubes, (ii) graphene or exfoliated graphite, (iii) carbon black, or (iv) any combination thereof.

8. The method of claim 1, wherein the conductive additives comprise: (i) graphene, (ii) graphene oxide, (iii) exfoliated graphite, (iv) carbide flakes, or (v) any combination thereof.

9. The method of claim 1, wherein the densified electrode layer comprises composite particles that comprise the active material.

10. The method of claim 9, wherein the conductive additives exhibit a first surface charge that is opposite to a second surface charge of the composite particles.

11. The method of claim 9, wherein the active material comprises Si.

12. The method of claim 11, wherein the composite particles comprise the Si and C.

13. The method of claim 10, wherein the composite particles are nanocomposite particles.

14. The method of claim 1, wherein a weight fraction of the conductive additives in the densified electrode layer ranges from about 0.02 wt. % to about 10 wt. %.

15. The method of claim 1, wherein the depositing deposits the pre-calendering electrode layer as a dry electrode coating.

16. The method of claim 1, wherein the depositing deposits the pre-calendering electrode layer via a slurry coating.

17. The method of claim 16, wherein the slurry coating is an aqueous slurry.

18. The method of claim 1, wherein the areal capacity loading ranges from about 4 mAh/cm$^2$ to about 6 mAh/cm$^2$.

19. The method of claim 1, wherein the areal capacity loading ranges from about 6 mAh/cm$^2$ to about 9 mAh/cm$^2$.

20. The method of claim 1, wherein the second porosity comprises between about 10 vol. % to about 20 vol. % of the densified electrode layer.

21. The method of claim 1, wherein the second porosity comprises between about 20 vol. % to about 30 vol. % of the densified electrode layer.

22. The method of claim 1, wherein a minimum separation distance between the one or more respective surfaces of the one or more pressure rollers and a surface of the pre-calendering electrode layer is modulated during the calendering.

23. The method of claim 22, wherein the modulation is periodic.

24. The method of claim 22, wherein the modulation is aperiodic.

25. The method of claim 22, wherein an amplitude of the modulation ranges from about 0.5% to about 20% of a thickness of the pre-calendering electrode.

26. The method of claim 22,
wherein the pre-calendering electrode layer comprises composite particles that comprise the active material, and wherein an amplitude of the modulation ranges from about 50% to about 2,000% of an average diameter of the composite particles.

27. The method of claim 22, wherein a frequency of the modulation is in a range from about 0.1 Hz to about 10 MHz.

28. The method of claim 27, wherein a frequency of the modulation is in a range from about 0.1 Hz to about 20 Hz.

29. The method of claim 27, wherein a frequency of the modulation is in a range from about 22 kHz to about 10 MHz.

30. The method of claim 22, wherein the modulation is based on a first function associated with a first frequency and a first amplitude and a second function associated with a second frequency and a second amplitude.

31. The method of claim 1, wherein the densified electrode layer further comprises ceramic nanofibers.

32. The method of claim 31, wherein the ceramic nanofibers comprise two or more of: aluminum (Al), oxygen (O), magnesium (Mg), lithium (Li), sodium (Na), and silicon (Si).

33. The method of claim 31, wherein at least one of the ceramic nanofibers is porous.

34. The method of claim 1, wherein the calendared electrode is configured for use as a Li-ion battery anode.

* * * * *